US011421749B2

(12) United States Patent
Muramatsu

(10) Patent No.: US 11,421,749 B2
(45) Date of Patent: Aug. 23, 2022

(54) VIBRATION DAMPER AND ELECTRONIC DEVICE

(71) Applicant: Ricoh Company, Ltd., Tokyo (JP)

(72) Inventor: Koichi Muramatsu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 693 days.

(21) Appl. No.: 16/346,984

(22) PCT Filed: Nov. 13, 2017

(86) PCT No.: PCT/JP2017/040702
§ 371 (c)(1),
(2) Date: May 2, 2019

(87) PCT Pub. No.: WO2018/101010
PCT Pub. Date: Jun. 7, 2018

(65) Prior Publication Data
US 2020/0063815 A1 Feb. 27, 2020

(30) Foreign Application Priority Data

Nov. 30, 2016 (JP) .............................. JP2016-232802
Apr. 20, 2017 (JP) .............................. JP2017-083431

(51) Int. Cl.
*F16F 15/03* (2006.01)
*F16F 7/08* (2006.01)
(Continued)

(52) U.S. Cl.
CPC .............. *F16F 7/085* (2013.01); *F16F 7/023* (2013.01); *G03B 17/561* (2013.01)

(58) Field of Classification Search
CPC ....... F16F 15/03; F16M 11/046; F16M 11/12; F16M 11/18; F16M 13/00; G03B 17/561; G03B 5/00
See application file for complete search history.

(56) References Cited

U.S. PATENT DOCUMENTS 5,850,576 A * 12/1998 Matsuzawa ........ H04N 5/23287
359/554
6,611,662 B1 * 8/2003 Grober .................... B63B 29/12
396/421

(Continued)

FOREIGN PATENT DOCUMENTS

CN 1725096 A 1/2006
CN 2757181 Y 2/2006

(Continued)

OTHER PUBLICATIONS

Combined Chinese Office Action and Search Report dated May 10, 2021 in Patent Application No. 201780073119.3 (with English translation of Category of Cited Documents), 8 pages.

(Continued)

*Primary Examiner* — Thomas W Irvin
(74) *Attorney, Agent, or Firm* — Xsensus LLP

(57) ABSTRACT

A vibration damper (11) including a movable section ((20) to move in at least one direction; a support section to movably support the movable section; a vibration detector (29) to detect a vibration received by the vibration damper; and a computing processor (30) to compute an amount of displacement of the movable section (20) in a first direction, which is associated with the vibration, based on a detection result of the vibration detector (29) to obtain an amount of correction corresponding to the amount of displacement. The support section moving the movable section (20) in a second direction opposite to the first direction based on the amount of correction obtained by the computing processor (30).

18 Claims, 38 Drawing Sheets

(51) Int. Cl.
*F16F 7/02* (2006.01)
*G03B 17/56* (2021.01)

(56) References Cited

U.S. PATENT DOCUMENTS

| | | | | |
|---|---|---|---|---|
| 7,642,741 | B2* | 1/2010 | Sidman | G01C 21/18 |
| | | | | 318/648 |
| 8,179,078 | B2* | 5/2012 | Sidman | F16M 11/2014 |
| | | | | 318/648 |
| 8,861,947 | B2* | 10/2014 | Webb | H04N 5/2252 |
| | | | | 396/421 |
| 9,574,703 | B2* | 2/2017 | Firchau | F16M 11/24 |
| 2009/0189987 | A1 | 7/2009 | Muramatsu et al. | |
| 2010/0013939 | A1 | 1/2010 | Ohno et al. | |
| 2010/0079101 | A1* | 4/2010 | Sidman | F16M 11/041 |
| | | | | 224/272 |
| 2010/0089712 | A1 | 4/2010 | Butler et al. | |
| 2012/0038784 | A1 | 2/2012 | Irisawa et al. | |
| 2012/0147355 | A1 | 6/2012 | Butler et al. | |
| 2013/0276627 | A1 | 10/2013 | Luo | |
| 2014/0104482 | A1 | 4/2014 | Muramatsu et al. | |
| 2014/0185013 | A1 | 7/2014 | Brown | |
| 2014/0218551 | A1 | 8/2014 | Muramatsu | |
| 2014/0270744 | A1* | 9/2014 | Webb | H04N 5/2328 |
| | | | | 396/55 |
| 2014/0327895 | A1 | 11/2014 | Waldis et al. | |
| 2016/0201847 | A1* | 7/2016 | Firchau | F16M 11/18 |
| | | | | 224/567 |
| 2017/0019599 | A1 | 1/2017 | Muramatsu et al. | |

FOREIGN PATENT DOCUMENTS

| | | |
|---|---|---|
| CN | 101452186 A | 6/2009 |
| CN | 101470314 A | 7/2009 |
| CN | 101578853 A | 11/2009 |
| CN | 102629975 A | 8/2012 |
| CN | 104345516 A | 2/2015 |
| CN | 104698722 A | 6/2015 |
| CN | 204420520 U | 6/2015 |
| CN | 104811637 A | 7/2015 |
| CN | 104931033 A | 9/2015 |
| CN | 105074562 A | 11/2015 |
| CN | 204805905 U | 11/2015 |
| CN | 205539861 U | 8/2016 |
| CN | 105937697 A | 9/2016 |
| CN | 205507322 U | 10/2016 |
| CN | 106090549 A | 11/2016 |
| CN | 109035308 A | 12/2018 |
| JP | 10-142646 A | 5/1998 |
| JP | 2004-193916 A | 7/2004 |
| JP | 2006-020261 A | 1/2006 |
| JP | 2007-052887 A | 3/2007 |
| JP | 2007-183356 A | 7/2007 |
| JP | 2012-235233 A | 11/2012 |
| JP | 2013-26681 A | 2/2013 |
| JP | 2017-191284 A | 10/2017 |
| WO | WO2013192370 A2 | 12/2013 |
| WO | WO 2015119488 A1 | 8/2015 |

OTHER PUBLICATIONS

Combined Chinese Office Action and Search Report dated Nov. 2, 2020 in corresponding Chinese Patent Application No. 201780073119.3 (with English Translation of Category of Cited Documents), 10 pages.

International Search Report and Written Opinion dated Feb. 12, 2018 in PCT/JP2017/040702 filed on Nov. 13, 2017.

* cited by examiner

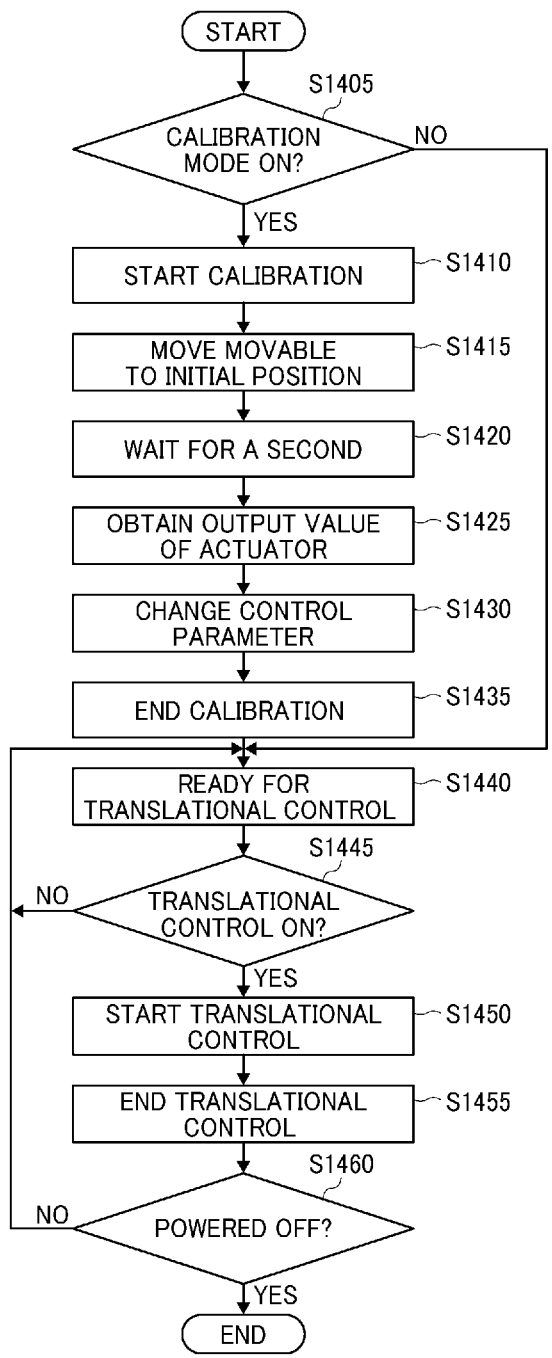

FIG. 28A   FIG. 28 | FIG. 28A |
                   | FIG. 28B |
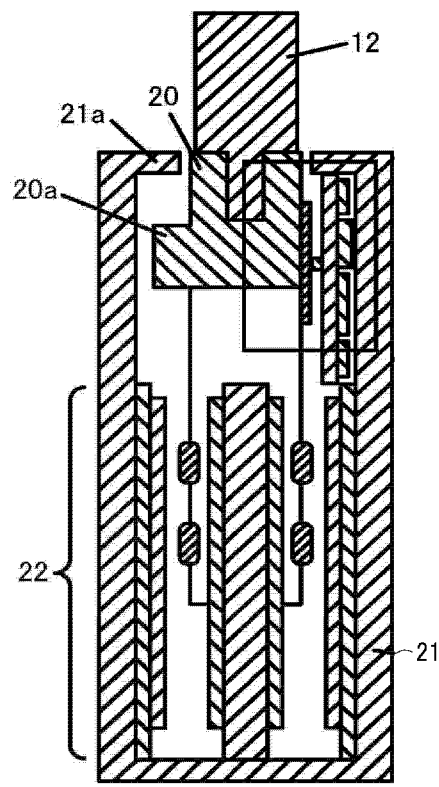

VIBRATION DAMPER AND ELECTRONIC DEVICE

TECHNICAL FIELD

The present disclosure relates to a vibration damper to suppress vibration of an electronic device and an electronic device incorporating the same.

BACKGROUND ART

When an image capturing device such as a digital camera or a video camera is carried in a user $B!G (Bs hand or mounted on, for example, a vehicle, vibrations are generated in the image capturing device due to slight movements of the hand or the shake of the vehicle. Such a vibration might cause poor-resolution images.

In view of such circumstances, the technology is proposed that utilizes the principle that a flywheel, which is a rotating body, attempts to maintain its posture to prevent the rotational movement of the image capturing device that occurs during the operation of capturing an image and support a spring with an arm, absorbing a translational motion, i.e., vertical vibration of the image capturing device (see, for example, Patent Document 1).

CITATION LIST

Patent Literature

[PTL 1] JP-3845430-B

SUMMARY OF INVENTION

Technical Problem

In the technology to absorb the transitional motion with a spring, however, the advantageous effects that damp the vibration is restricted by frequency response characteristic of a spring, and thereby a controllable frequency bandwidth is narrow. Thus, the advantageous effects are exhibited only to limited vibrations.

Solution to Problem

In view of the above, there is provided vibration damper including a movable section to move in at least one direction, a support section to movably support the movable section, a vibration detector to detect a vibration received by the vibration damper, and a computing processor to compute an amount of displacement of the movable section in a first direction, which is associated with the vibration, based on a detection result of the vibration detector to obtain an amount of correction corresponding to the amount of displacement. The support section moves the movable section in a second direction opposite to the first direction based on the amount of correction obtained by the computing processor.

Advantageous Effects of Invention

Accordingly, one or more embodiments of the present invention can provide a vibration damper capable of suitably damping generated vibration and an electronic device incorporating the vibration damper.

BRIEF DESCRIPTION OF DRAWINGS

FIG. 14 is a flowchart of processing according to a second Example performed by the vibration damper.

DESCRIPTION OF EMBODIMENTS

Figure 1:
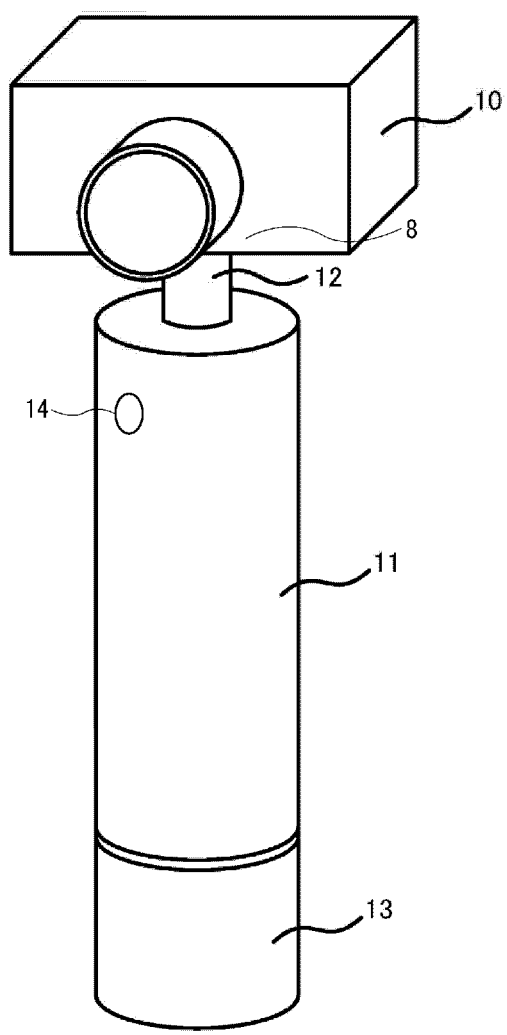
FIG. 1 is an illustration of an example configuration of an image capturing device as an electronic device mountable on a vibration damper.

FIG. 1 is a diagram showing a configuration example of an image capturing device 10 as an electronic device provided with a vibration damper 11. In the present embodiment, examples of the image capturing device 10 as an electronic device includes a digital camera or a video camera. However, no limitation is intended therein.

The image capturing device 10 has a thread groove 8 to connect with, for example, a tripod stand that stably supports the image capturing device 10, which prevents hand movement (camera shake) or allows capturing an image with a user $B!G (Bs hands free.

Here, a description is given of a configuration of a camera as an example of the image capturing device 10. The camera includes an optical system, an image sensor, and an image processing system. The optical system includes a plurality of lenses. The image sensor converts incident light having passed through the plurality of lenses into an electric signal. Examples of the image sensor include, for example, a charge couple device (CCD) image sensor and a complementary metal oxide semiconductor (CMOS) image sensor. The image processing system includes an analog-to-digital (A/D) converter, a storage device such as a dynamic random access memory (DRAM), an application specific integrated circuit, which is an integrated circuit for specific application, an input/output interface (I/F), a communication I/F, and a battery. These components are well known in the art, and thus its description is omitted.

The vibration damper 11 has a tripod screw 12 screwed into the thread groove 8 of the image capturing device 10 to connect with the image capturing device 10. Further, the vibration damper 11 is mounted with a battery 13 to supply power to operate various internal electronic components. The vibration damper 11 of FIG. 1 has the tripod screw 12 protruding from the top of the vibration damper 11, having the battery 13 attached to the bottom of the vibration damper 11.

Figure 2:
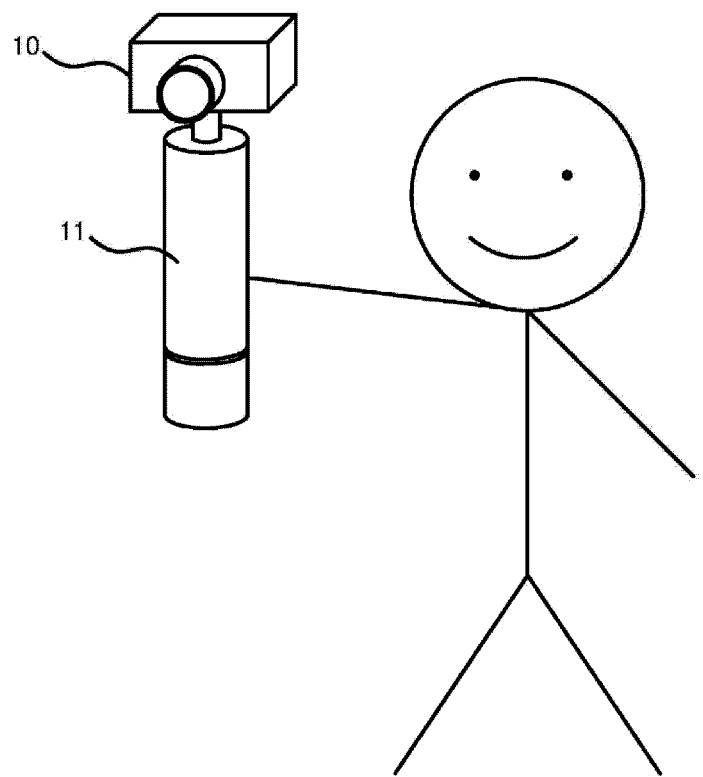
FIG. 2 is an illustration for explaining how the image capturing device of FIG. 1 is used.

FIG. 2 is an illustration of the manner in which a user as a photographer uses the image capturing device 10 mounted on the vibration damper 11. The vibration damper 11 has a size that allows the user to use it with one hand. The vibration damper 11 may have a shape, such as a cylinder, a square prism, a triangular prism, a cone, or a quandrangular pyramid. With such a configuration, the user can hold the vibration damper 11, instead of the image capturing device 10, with one hand to capture a moving image. Although the image capturing device 10 is capable of capturing a still image, the following describes the cases where the image capturing device 10 is used to capture a moving image.

The user holds the vibration damper 11 with one hand, thereby supporting the image capturing device 10, so that vibration is transmitted to the vibration damper 11. The vibration damper 11, however, damps the input vibration, and thereby reduces the vibration to be transmitted to the image capturing device 10 mounted on the vibration damper 11. As a result, the image capturing device 10 can capture an image with reduced vibration.

Figure 3A:
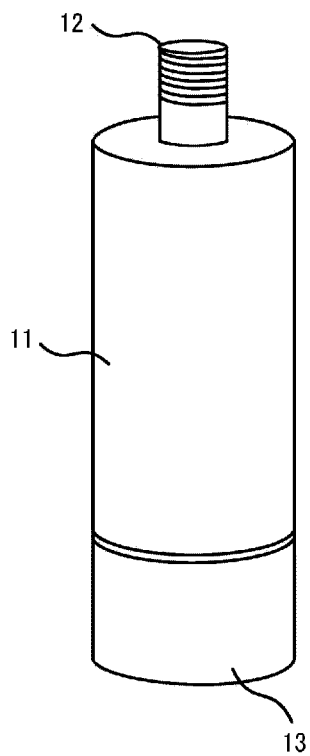
FIG. 3A is a perspective view of an example of the vibration damper illustrated in FIG. 1.
Figure 3B:
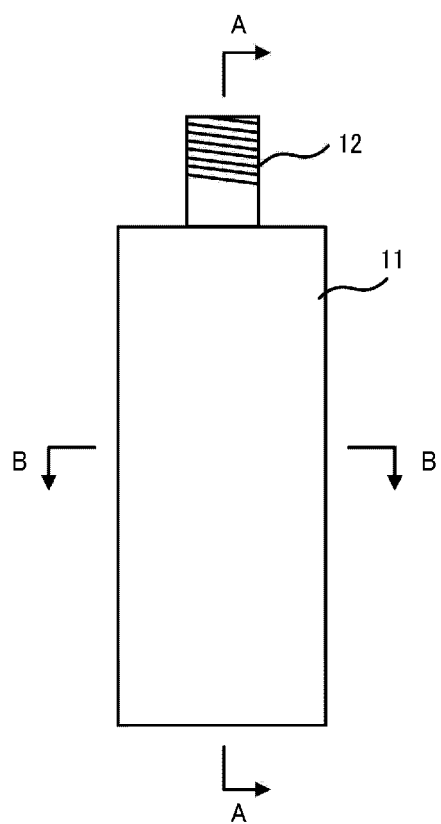
FIG. 3B is a front view of an example of the vibration damper illustrated in FIG. 1.
Figure 3C:
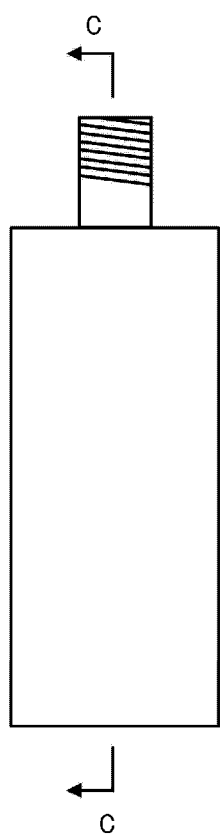
FIG. 3C is a side view of an example of the vibration damper illustrated in FIG. 1.
Figure 4A:
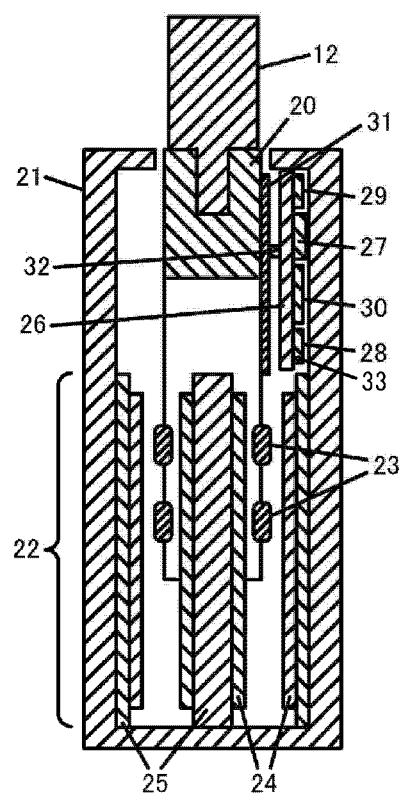
FIGS. 4A through 4D (FIG. 4) are illustrations of an example of an internal structure of the vibration damper.

FIGS. 3A, 3B, and 3C are a perspective view, a front view, and a side view of an example of the vibration damper 11 to damp the vibration to be transmitted to the image capturing device 10, respectively. The vibration damper 11 includes the tripod screw 12 protruding beyond the top of the vibration damper 11. Further, as illustrated in FIG. 4A, the tripod screw 12 is connected to a movable section 20 within a housing 21 of the vibration damper 11. The movable section 20 can move the image capturing device 10 in at least one direction. In the present embodiment, the movable section 20 moves the image capturing device 10 in the vertical direction as an example of at least one direction. The movable section 20 is connected to the tripod screw 12 and moves together with the tripod screw 12 in the vertical direction. The movable section 20 and the tripod screw 12 may be joined by welding or may be connected by fitting or adhesion.

Figure 4B:
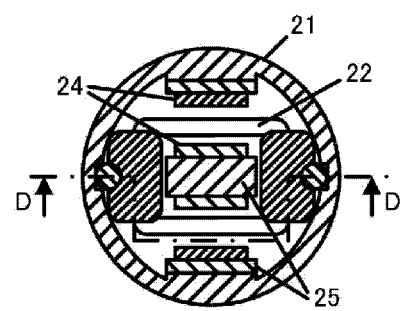
Figure 4C:
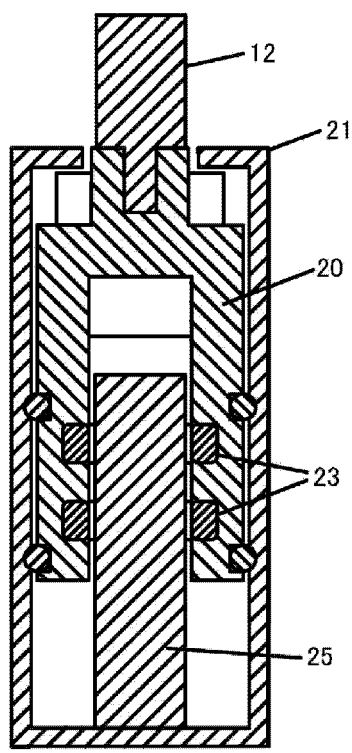
Figure 4D:
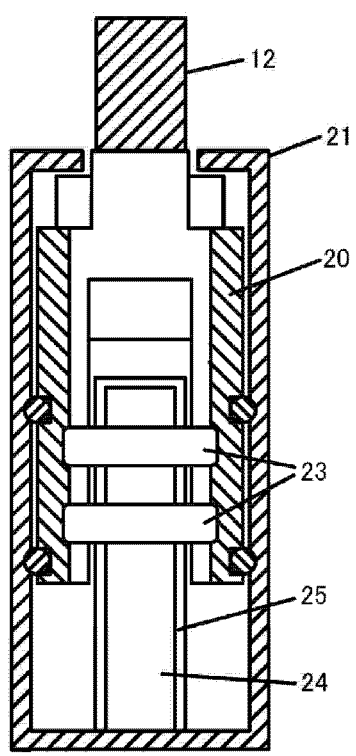

FIG. 4A is a sectional view of an internal structure taken along line A-A in the front view in FIG. 3B. FIG. 4B is a sectional view of an internal structure taken along line B-B in the front view FIG. 3B. FIG. 4C is a sectional view of an internal structure taken along line C-C in the side view of FIG. 3C. FIG. 4D is a sectional view of an internal structure taken along line D-D in FIG. 4B.

The vibration damper 11 includes at least the movable section 20, an actuator 22, a printed circuit board (PCB) substrate 26, a memory 27, a gyro sensor 28, an acceleration sensor 29, a computing chip 30, a magnetic tape 31, and a magnetic sensor (Hall sensor) 32 in the interior of the housing 21. The actuator 22 as a support section movably supports the movable section 20. The actuator 22 includes coils 23, permanent magnets 24, and iron-plate yokes 25.

In FIG. 4A, the PCB substrate 26 is disposed between the movable section 20 and the housing 21. On the PCB substrate 26, the acceleration sensor 29, the memory 27, the computing chip 30, and the gyro sensor 28 are mounted. The gyro sensor 28 is one example of a rotation detector that detects information on rotational movement around the center of gravity of the vibration damper 11 mounted with the image capturing device 10. The acceleration sensor 29 is one example of a vibration detector that detects vibration of the vibration damper 11. The computing chip 30 is one example of a computing unit that calculates an amount of correction for a displacement amount in a displacement direction due to the vibration. The memory 27 is one example of a storage unit that stores detection results of the rotation detector.

As the rotation detector, the gyro sensor 28 that measures a rotation angle (angular velocity) per unit time as a component of rotational movement is used. As the vibration detector, the acceleration sensor 29 that measures acceleration as a component of translational movement is used. Since these are only examples, other devices may be adopted as long as they can detect information on rotational movement and information on translational movement. As the computing unit, the computing chip 30 including a central processing unit (CPU) and a micro processor unit (MPU) may be used.

Further, the magnetic sensor 32, which is one example of a movement-amount detector to detect an amount of movement of the movable section 20, is provided in the interior of the housing 21. The magnetic tape 31 is attached to the outer surface of the movable section 20 to extend in the vertical direction. The magnetic sensor 32 as the movement-amount detector detects the amount of movement by detecting the magnetism from the magnetic tape 31. In FIG. 4A, the magnetic sensor 32 is disposed facing the magnetic tape 31 on back of the surface of the PCB substrate 26 on which the gyro sensor 28 is mounted.

When the user captures an image, holding the vibration damper 11 mounted with the image capturing device 10 in one hand, the acceleration sensor 29 detects acceleration with respect to the translational movement that is a vertical swing. The acceleration detected by the acceleration sensor 29 is input to the computing chip 30 as information of translational movement. The computing chip 30 performs an integral operation using the input information and calculates the amount of displacement in a direction of displacement direction (displacement direction in which the movable section is displaced). Based on the calculated amount of displacement, the computing chip 30 calculates an amount of correction for moving the movable section 20 by the amount of displacement in a direction to cancel the displacement, that is, in a direction opposite to the displacement direction. The computing chip 30 further makes an instruction to move the movable section 20 by the amount of correction in the direction to cancel the displacement. The actuator 22 moves the movable section 20 by the amount of correction in the direction to cancel the displacement.

When the actuator 22 moves the movable section 20, the magnetic sensor 32 detects the amount of movement and inputs the detected amount of movement to the computing chip 30, as a detection result. The computing chip 30 calculates an amount of difference between the amount of correction and the input amount of movement. The vibration damper 11 includes a proportional integral differential (PID) as a controller to perform a feedback control to reduce the amount of difference. In the present embodiment, the PID controller 33 performs a feedback control. However, the computing chip 30 may perform the feedback control. The PID controller 33 may be provided on the PCB board 26.

At the time of capturing an image, the rotational movement occurs together with the translational movement. The gyro sensor 28 detects the angular velocity for the rotational movement.

Figure 5:
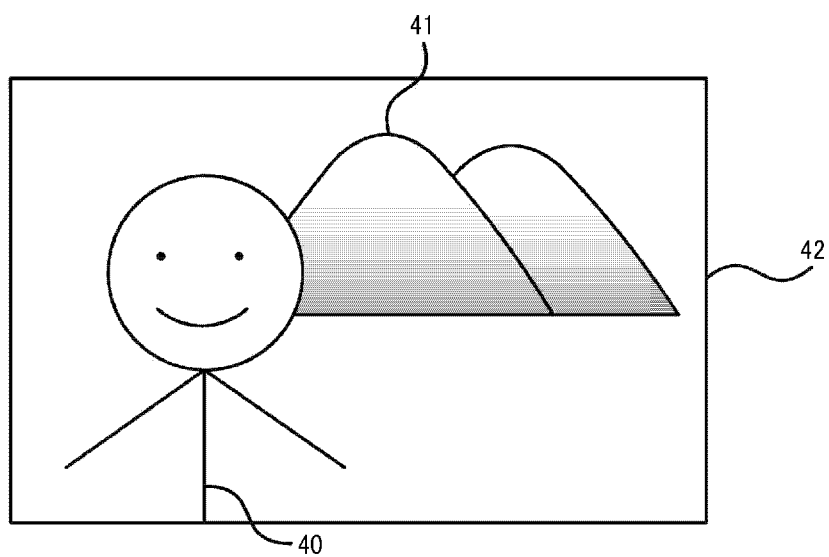
FIG. 5 is an illustration of one frame obtained by simultaneously capturing a moving image of a person and a mountain.
Figure 6:
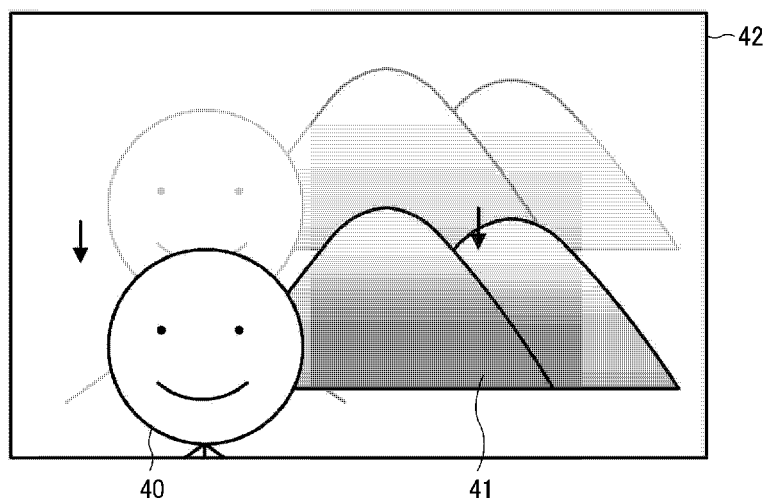
FIG. 6 is an illustration of one frame in a case where the image capturing device rotationally moves while capturing a moving image.
Figure 7:
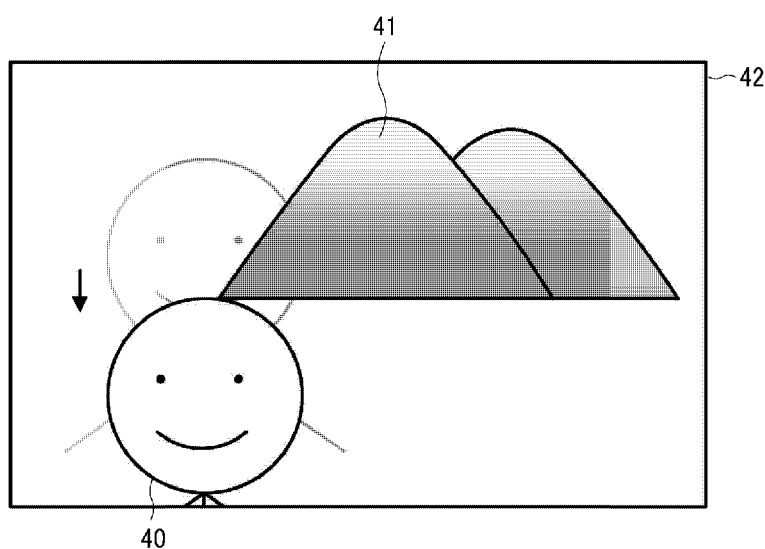
FIG. 7 is an illustration of one frame in a case where the image capturing device moves in parallel while capturing a moving image.

Here, a description is given of a difference in images between the cases of vibrations due to translational motion and rotational motion. FIG. 5 is an illustration of one frame (one of a plurality of still images constituting a moving image) of a moving image obtained by simultaneously capturing a moving image of a person 40 at a short distance from the image capturing apparatus 10 and a mountain 41 existing at a distance. FIG. 6 is an illustration of a case where the image capturing device 10 rotationally moves. In the image 42 of one frame, the person 40 and the mountain 41 move together in the direction indicated by arrow in FIG. 6. The rotational movement is regarded as a change in angle relative to the horizontal direction in which the optical axis perpendicular to the lens surface is directed with the center of gravity of the image capturing device 10 as the center. FIG. 7 is an illustration of a case where the image capturing device 10 makes a translational movement in the vertical direction. In the image 42 of one frame, the person 40 near the image capturing device 10 moves in the direction indicated by arrow in FIG. 7 while the mountain 41 far away from the image capturing device 10 hardly moves.

As described above, with respect to the rotational movement, since both the nearby person 40 and the distant mountain 41 move together, a shaky, or out-of-focus, moving image can be corrected to a sharper image by changing the coordinate of the entire image 42 of each frame after capturing the moving image. On the other hand, with respect to the translational movement, only the nearby person 40 moves, and correcting only the person 40 separately by image processing is impossible. This is why a mechanical correction is performed for the translational movement.

Since the rotational movement may be corrected after capturing an image, the angular velocity detected by the gyro sensor 28 is stored in the memory 27 as information regarding rotational movement, that is, angular velocity information. The computing chip 30 readouts the angular velocity information from the memory 27 after capturing an image, and calculates the amount of correction of the rotational movement component.

One method of calculating the amount of correction of the rotational movement component by the computing chip 30 is described. First, a moving image obtained by a moving-image capturing operation is decomposed into frames to obtain still images. Each of the still images is shifted one time by an amount obtained by multiplying an angle, which has been obtained by integrating the angular velocity, by the focal length. The corrected still images are then combined as one moving image. Since this method is only an example, any other methods may be adopted as long as the same advantageous effects can be obtained.

In the configuration illustrated in FIG. 4A, the angular velocity information of the angular velocity detected by the gyro sensor 28 is stored in the memory 27, but the present disclosure is not limited to this. Alternatively, in some embodiments, the vibration damper 11 further includes a communicator such as a communication OF to transmit the angular velocity information to an external device such as a personal computer (PC). In this configuration, a correction for the above-described rotational movement is calculated by the external device, and transmitted to the vibration damper 11.

Figure 8:
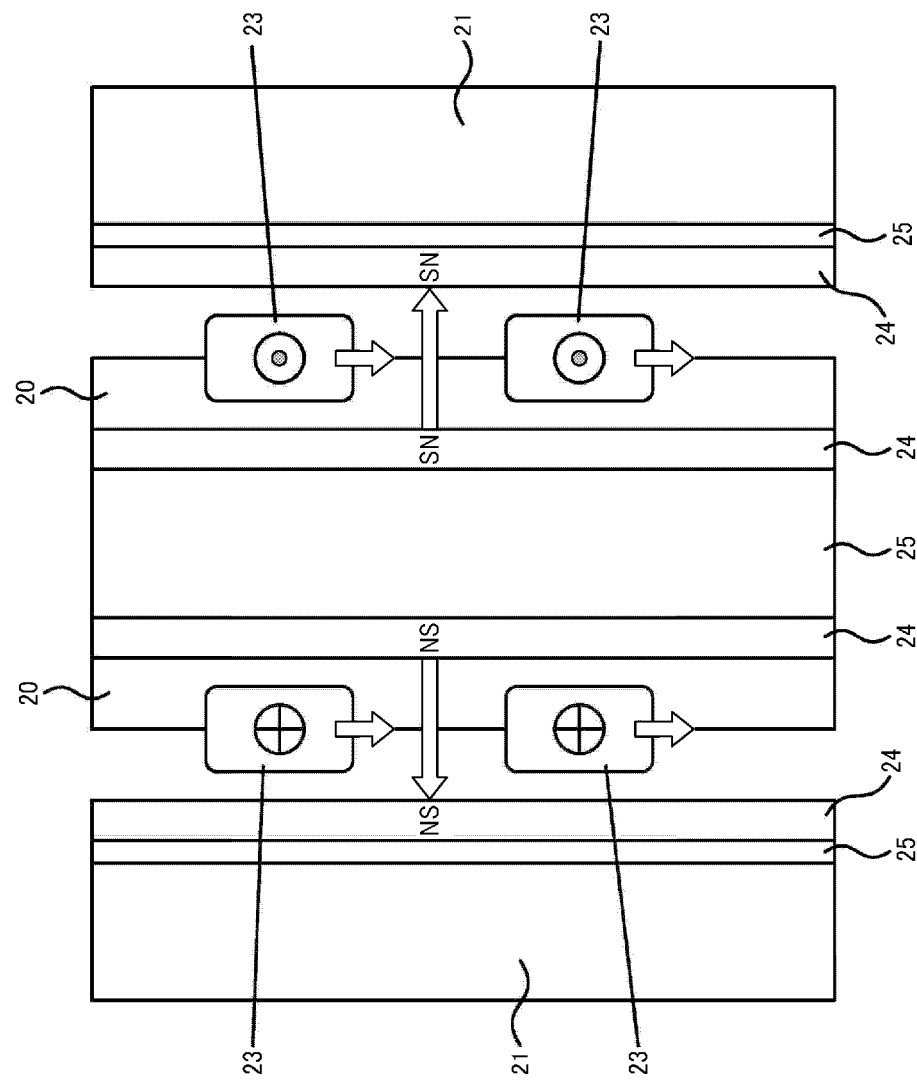
FIG. 8 is an illustration of an example of a support section (an actuator) included in the vibration damper.

Next, a description is given of the actuator 22 with referring to FIG. 8. The actuator 22 includes the two coils 23 disposed between the permanent magnets 24 attached to the iron-plate yokes 25. The two coils 23 are disposed, for example, to be fitted to two legs of the movable section 20 that is substantially U-shaped (with all right angles) as illustrated in FIG. 4C. The permanent magnets 24 are attached to the iron-plate yokes 25 in the following manner. One of the iron-plate yokes 25 in the center contacts the south (S) pole of the permanent magnets 24. The iron-plate yokes 25 disposed on the inner surface of the housing 21, i.e., on the side of the outer circumference (outer circumferential side) of the housing 21 contact the north (N) pole of the permanent magnets 24. The iron-plate yoke 25 in the center has the lowest part connected to the bottom surface of the casing having a hollow structure. Each set of the two coils 23 is disposed between the permanent magnet 24 attached to the iron-plate yoke 25 in the center and the permanent magnet 24 attached to the iron-plate yoke 25 on the outer circumferential side. Accordingly, magnetic fields are generated in directions indicated by arrows in FIG. 8 from the center toward the outer circumference of the housing 21.

Electric current flows through the two coils 23. In the example illustrated in FIG. 8, the electric current flows through the coils 23 on the left side in a direction from the front side toward the rear side with respect to the surface of the paper on which FIG. 8 is drawn. Further, the electric current flows through the coils 23 on the right side in a direction from the rear side toward the front side with respect to the surface of the paper. In this configuration, a force (drive force) is generated in a direction (upward direction) opposite of the direction indicated by arrow (according to Fleming's left hand rule). With a change in direction of current flow, a drive force can be generated in downward direction. Accordingly, generating the drive force can vertically move the movable section 20 provided with the two sets of the coils 23.

The vibration damper 11 corrects the transitional movement by mechanically moving the movable section 20 in the vertical direction. The vibration damper 11 also corrects the rotational movement by obtaining the angular velocity information, storing the obtained angular velocity information, and reading out the stored angular velocity information after the image-capturing operation to correct a captured image. Thus, the configuration according to the present embodiment can achieve a compact vibration damper with additional minimum number of mechanical elements and electronic components while preventing quality deterioration of the captured image.

Instead of the configuration that absorbs the translational movement with a spring, adopting the mechanical correction that utilizes the above-described actuator 22 can increase the control bandwidth of vibration in the vertical direction. In addition, adopting the mechanical correction can also downsize the vibration damper 11, which allows the vibration damper 11 to be used with one hand when attached to an electronic device such as the image capturing device 10.

Figure 9:
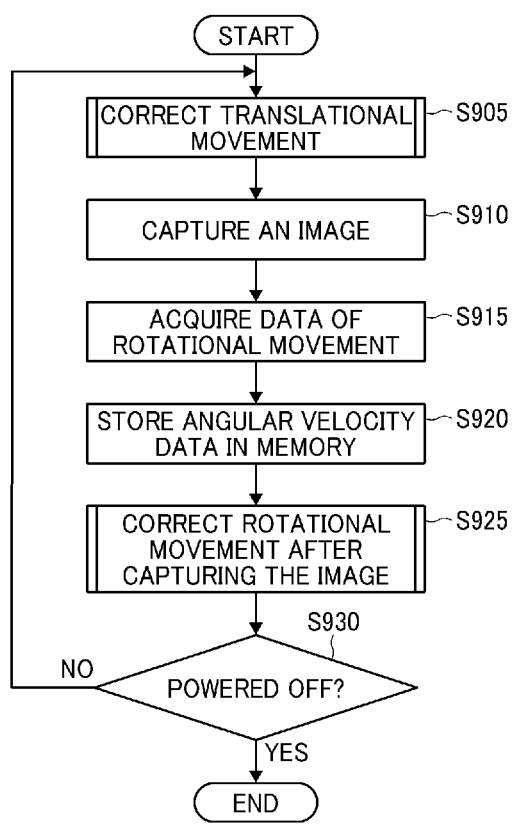
FIG. 9 is a flowchart of processing according to a first Example performed by the vibration damper.

The following describes image processing performed by the vibration damper 11 as illustrated in FIGS. 3A through 3C and 4A through 4C, referring to FIG. 9. The vibration damper 11, which is mounted with the battery 13, starts the processing when powered on. The vibration damper 11 is powered on by the user $B!G (Bs pressing a power key. Alternatively, in some embodiments, the vibration damper 11 may be powered on in response to an input of a signal transmitted from an external device connected with the vibration damper 11 via a network or through a wired connection. The vibration damper 11 performs a correction process on a transitional movement in step S905.

In step S910, the user starts capturing an image using the image capturing device 10. In step S915, the vibration damper 11 obtains data of a rotational movement. In other words, the gyro sensor 28 detects an angular velocity of the vibration damper 11. In step S920, the vibration damper 11 stores the data of the detected angular velocity in the memory 27 as angular velocity information. In step S925, the computing chip 30 of the vibration damper 11 performs a correction process on the rotational movement after an image is captured.

In step S930, the vibration damper 11 determines whether power is off under control of the computing chip 30. When the vibration damper 11 is still powered on, the process returns to step S905 to perform the correction process of the transitional movement in preparation for the next image-capturing process. When the vibration damper 11 is powered off, the processing ends.

Figure 10:
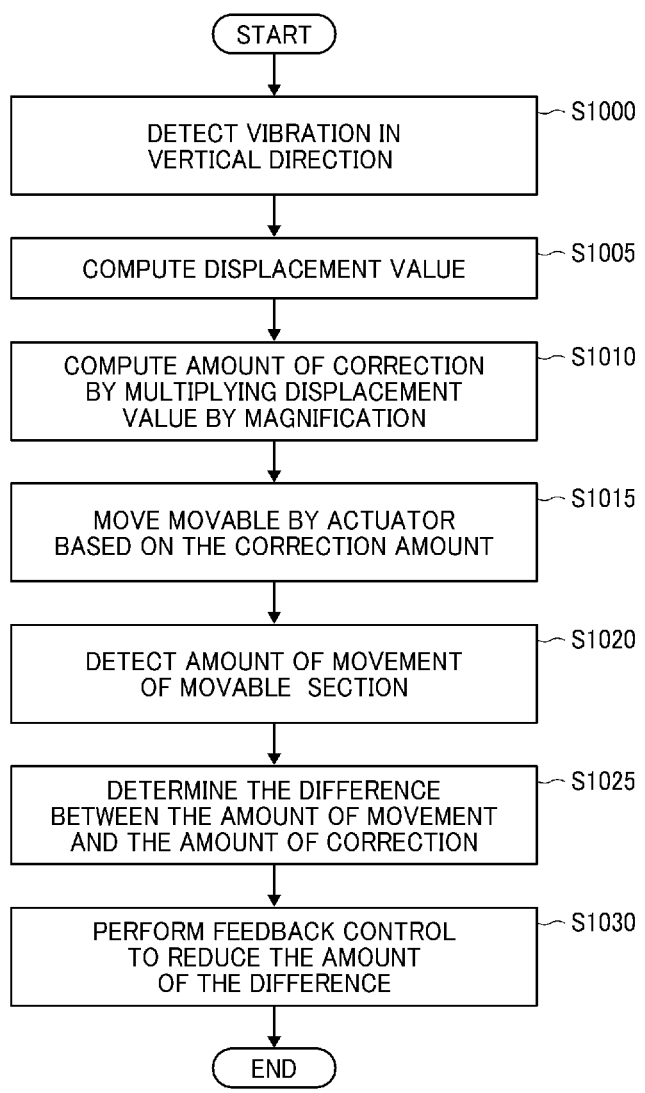
FIG. 10 is a flowchart of an example of a correction process for a translational movement.
Figure 11:
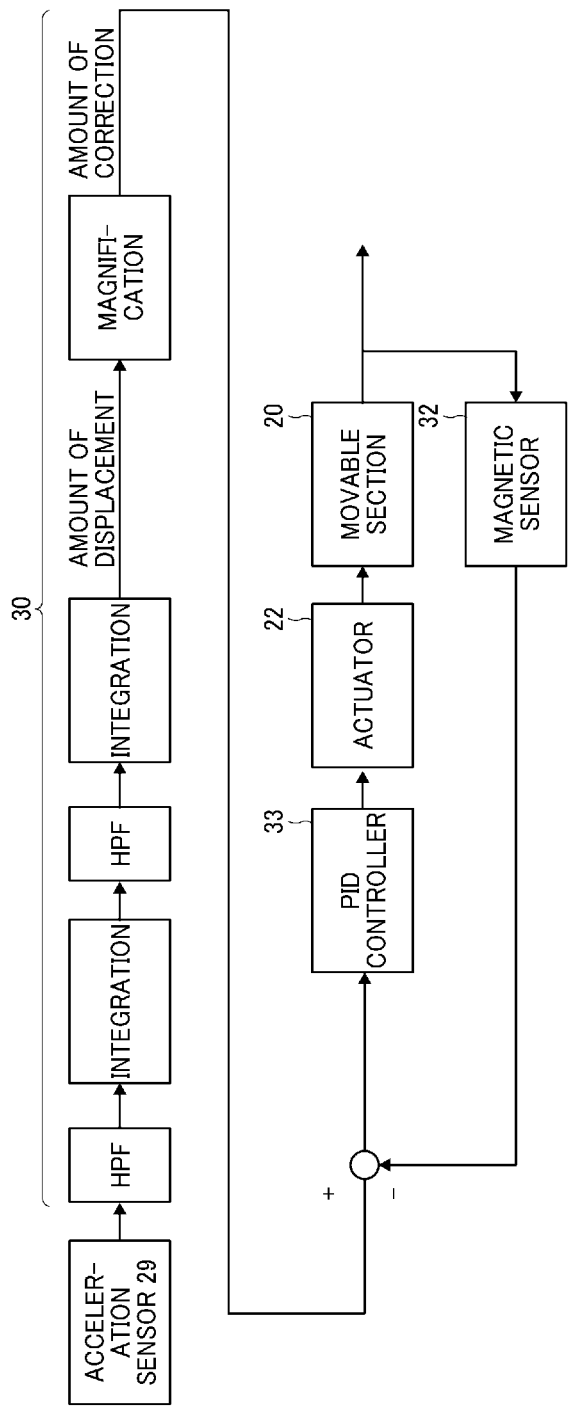
FIG. 11 is a block diagram of an example of signal transmission in correction of the translational movement of the image capturing device.

A detailed description is given of the correction process of the transitional movement in step S905 of FIG. 9, referring to FIGS. 10 and 11. FIG. 10 is a flowchart of an example of the correction process of the transitional movement. FIG. 11 is a block diagram of an example of a signal transmission in the correction process of the transitional movement. The following describes the correction process of the transitional movement referring to FIG. 10. In step S1000, the acceleration sensor 29 first detects a shake in the vertical direction which is a translational motion as vibration. The vibration is detected as acceleration. The acceleration sensor 29 outputs acceleration information of the detected acceleration to the computing chip 30.

In step S1005, the computing chip 30 performs an integral operation using the acceleration information detected in step S1000 to calculate an amount of displacement. The amount of displacement can be obtained by integrating acceleration twice in time. In step S1010, the computing chip 30 calculates an amount of correction by multiplying the amount of displacement obtained in step S1005, by the image-capturing magnification. The image-capturing magnification represents the ratio of the size of the image captured on the image-capturing surface of the image sensor of the image capturing device 10 to the actual size of the image-capturing target. The information on the image-capturing magnification may be acquired from the image capturing device 10 or may be set in advance. When acquiring from image capturing device 10, the vibration damper 11 can acquire the information of the image-capturing magnification by communicating with the image capturing device 10 using, for example, a communication I/F. Then, the computing chip 30 instructs the actuator 22 to move the movable section 20 in a direction to cancel the displacement.

In step S1015, the actuator 22 moves the movable section 20 in the direction to cancel the displacement based on the amount of correction obtained by the computing chip 30 in step S1010. In step S1020, the magnetic sensor 32 detects the amount of movement of the movable section 20 moved by the actuator 22 in step S1015. The magnetic sensor 32 outputs the detected amount of movement to the computing chip 30, as movement-amount information. In step S1025, the computing chip 30 calculates an amount of difference between the amount of correction and the amount of movement using the movement-amount information detected by the magnetic sensor 32 in step 1020. Then, in step S1030, the PID controller 33 performs a feedback control to reduce the amount of difference obtained by the computing chip 30 in step S1025.

The following further describes the correction process of the transitional movement, referring to FIG. 11. First, the acceleration sensor 29 acquires the acceleration (m/s2) of the vibration damper 11 as a signal, and outputs the acceleration information to the computing chip 30. Since the vibration in the vertical direction includes gravitational components, the computing chip 30 applies a high pass filter (HPF) to remove the gravity components from the acceleration information. Next, the computing chip 30 integrates the acceleration information, from which the gravity components have been removed, by time once to obtain the speed (m/s). In the case of the integral operation, measurement error components caused by various factors are accumulated in time, so the computing chip 30 applies the HPF to remove the measurement error components from the speed. Thereafter, the computing chip 30 integrates the speed, at which the measurement error components have been removed, by time once, and thereby obtains the amount of displacement (displacement amount) (m).

The computing chip 30 calculates the amount of correction by multiplying the displacement amount by the image-capturing magnification. The PID controller 33 determines a degree of drive force of the actuator 22 based on the amount of correction. Further, the PID controller 33 determines the direction and amount of electric current to flow into the two coils 23 based on the level of the drive force. The PID controller 33 lets the electric current to flow into the two coils 23 according to the determined amount and direction, thus to drive the actuator 22. The actuator 22 moves the movable section 20.

The magnetic sensor 32 detects the amount of movement of the movable section 20 and outputs the movement-amount information to the computing chip 30. The computing chip 30 calculates an amount of difference between the amount of movement and the amount of correction. The PID controller 33 performs a feedback control so as to reduce the amount of difference, and drives the actuator 22 to move the movable section 20, repeating the process of calculating the amount of difference.

Figure 12:
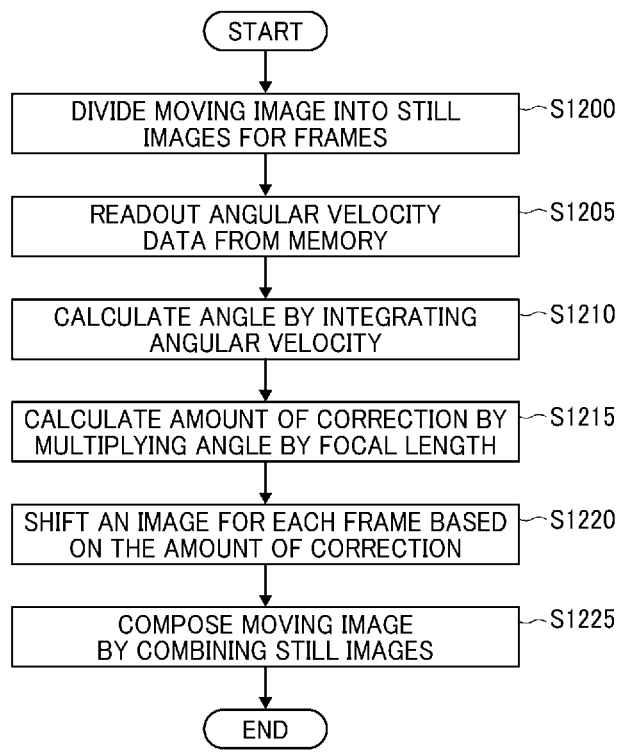
FIG. 12 is a flowchart of an example of a correction process of the rotational movement of the image capturing device.
Figure 13:
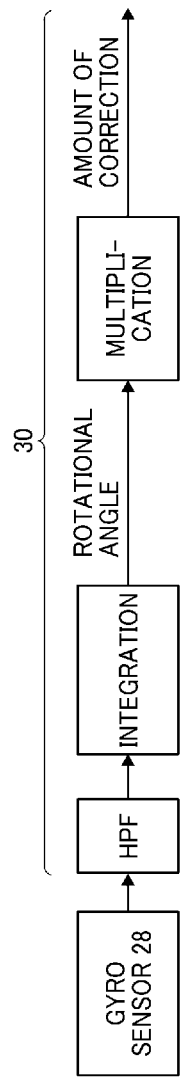
FIG. 13 is a block diagram of an example of vibration transmission in correction of the rotational movement of the image capturing device.

Next, a detailed description is given of the correction process of the rotational movement in step S925 in FIG. 9, referring to FIGS. 12 and 13. FIG. 12 is a flowchart of an example of the correction process of the rotational movement. FIG. 13 is a block diagram of an example of a signal transmission in the correction process of the rotational movement. Since the correction processing of rotational movement is performed after the image-capturing operation, the correction processing of rotational movement may be executed within the vibration damper 11 or may be executed by other information processing device such as a PC. To execute this process, the vibration damper 11 may include, for example, a communication I/F or an external storage I/F. That is, the vibration damper 11 uses the communication I/F to communicate with the image capturing device 10 so as to acquire a captured moving image. Further, the vibration damper 11 uses the external storage I/F to acquire a moving image stored in a recording medium such as a secure digital (SD) card from the recording medium. In the present embodiment, cases where the computing chip 30 included in the vibration damper 11 performs the correction process of the rotational movement are described.

The following further describes the correction process of the rotational movement, referring to FIG. 12. In step S1200, the computing chip 30 decomposes the moving image captured by the image capturing device in step S910 of FIG. 9 into frames to obtain still images. The moving image is composed of a plurality of still images, and the plurality of still images is arranged in order of image-capturing. Each of the still images constitutes a frame. For example, the computing chip 30 decomposes the moving image in order of image capturing, as the still image of the first frame, the still image of the second frame.

In step S1205, the computing chip 30 reads out and acquires angular velocity information from the memory 27. In step 1210, the computing chip 30 performs an integral operation on the angular velocity information acquired in step S1205 to calculate the rotation angle.

In step S1215, the computing chip 30 calculates an amount of correction by multiplying the rotation angle obtained in step S1205, by the focal length. The focal length is the distance to the focal point of a lens included in the image capturing device 10, and the focal point is the point where light parallel to the optical axis is refracted and collected. Similarly to the image-capturing magnification, the information on the focal length may be acquired from the image capturing device 10 or preset.

In step S1220, the computing chip 30 shifts the position of a still image for each frame as a whole based on the amount of correction obtained in step S1215. In step S1225, the computing chip 30 combines the still images, the positions of which have been shifted for the respective frames in step S1220, together in numerical order of frames number to form a moving image again.

The following further describes the correction process of the rotational movement, referring to FIG. 13. First, the gyro sensor 28 acquires the angular velocity (rad/s) as a signal, and outputs the angular velocity information to the computing chip 30. Since the angular velocity includes a measurement error, the computing chip 30 uses the HPF and removes the measurement error components from the angular velocity information. Next, the computing chip 30 integrates the angular velocity information, from which the measurement error components have been removed, by time once to obtain a rotation angle (rad). Finally, the computing chip 30 calculates the correction amount (mm) by multiplying the rotation angle by the focal length.

In the above description, the vibration damper 11 uses the gyro sensor 28 to detect the angular velocity and perform the correction process using the detected angular velocity with respect to the rotational movement. However, the present disclosure is not limited to this configuration. Alternatively, the correction process of the rotational movement may be performed by, for example, image processing.

Specifically, feature points in the still image are extracted from the still image for each frame obtained by capturing a moving image. For example, a set of pixels constituting an area where a pixel value of pixels of the still image abruptly changes may be extracted as feature points. Based on the extracted feature points, the amount of shift, for example, how many pixels to shift vertically is calculated. Then, the feature points for each frame are shifted by the calculated shift amount, and thus the still image of each frame is corrected. Finally, the still images are combined in numerical order of frames to form a moving image again. Such a configuration can achieve a moving image with less fluctuation due to rotational movement.

In the vibration damper 11, control parameters are set as control information on the feedback control so that vibration can be damped with high accuracy when the mass of the image capturing device 10 mounted on the top of the vibration damper 11 is within a specified range. The control parameter is a parameter set to obtain a loop gain as a constant loop gain in the feedback control. The loop gain represents how many times the value returned by feedback is multiplied with respect to the first input. Therefore, if the mass of the image capturing device 10 mounted on the top of the vibration damper 11 is within the specified range, vibration can be damped with high accuracy using the currently set control parameter.

However, when the mass of the image capturing device 10 is outside the specified range, the control error increases due to the currently set control parameter that is not appropriate, resulting in a decrease in accuracy of control. When the mass of the image capturing device 10 is large, outside the specified range, the vibration damper 1 with the currently set control parameter possibly fails to drive for vibration of the high frequency, thus failing to drive in a direction to appropriately cancel the displacement. When the mass of the image capturing apparatus 10 is small, outside the specified range, the control error might increase due to control oscillation or overshoot in the vibration damper 11 with the currently set control parameter. To handle such circumferences, preferably, the mass of the image capturing device 10 mounted on the vibration damper 11 is measured, and a control parameter is calibrated according to the measured mass.

To achieve such a configuration, the vibration damper 11 may operate in a calibration mode to calibrate a control parameter. The vibration damper 11 includes a selector 14 such as a mode selection key to select on or off of the calibration mode.

The mass of the image capturing device 10 attached to the vibration damper 11 is proportional to the amount of electric current flowing through the two coils 23 when the movable section 20 is moved to a fixed position. In view of the above, the vibration damper 11 may include an output value acquisition section to acquire, as an output value of the actuator 22, the amount of electric current flowing through the two coils 23 when the movable section 20 is moved to the preset initial position.

The computing chip 30 determines whether the output value acquired by the output value acquiring section is within a specified range. When the output value is outside the specified range, the vibration damper 11 changes the control parameter to be used by the PID controller 33, according to the output value. When the image capturing device 10 is heavy outside the range (in the case where the output value exceeds the upper limit of the range), the vibration damper 11 changes the control parameter so that the loop gain of the feedback control increases. When the image capturing device 10 is lightweight outside the range (in the case where the output value falls below the lower limit of the range), the vibration damper 11 changes the control parameter so that the loop gain of the feedback control decreases. With such a change in control parameter, the vibration damper 11 mounted with a heavy image capturing device can be adjusted to drive for vibration of the high frequency. Further, with such a change in control parameter, the vibration damper 11 mounted with a lightweight image capturing device can be adjusted to prevent or reduce the control error due to control oscillation or overshoot, thus allowing a high-performance control.

Referring to FIG. 14, a description is given of a process executed by the vibration damper 11 including the selector 14 and the output value acquiring section. The vibration damper 11, which is mounted with the battery 13, starts the processing when powered on by user $B!G (Bs pressing the power key. Alternatively, in some embodiments, the vibration damper 11 may be powered on in response to an input of a signal transmitted from an external device connected with the vibration damper 11 via a network line or through a wired connection. In step S1405, the vibration damper 11 determines whether the calibration mode is ON or not. When the calibration mode is ON ($B!H (BYES $B!I (B at S1405), the process proceeds to step S1410. When the calibration mode is OFF ($B!H (BNO $B!I (B at S1405), the process proceeds to step S1440.

The vibration damper 11 starts calibration processing in step S1410. The actuator 22 moves the movable section 20 to the initial position in step S1415.

Figure 15A:
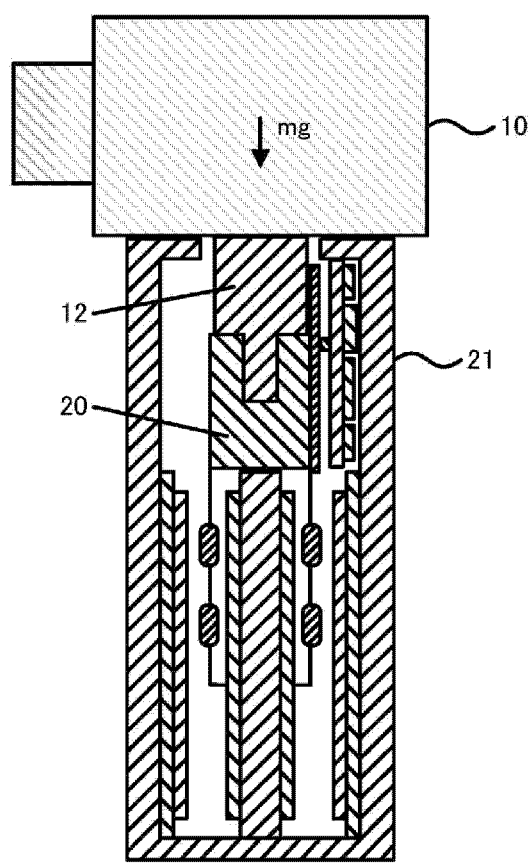
FIGS. 15A and 15B are illustrations of how a movable section moves to an initial position.
Figure 15B:
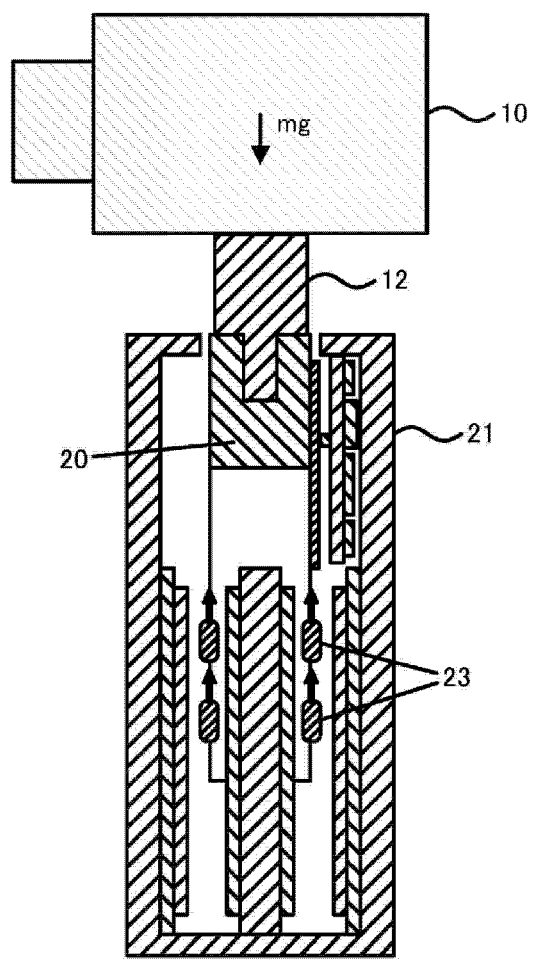

Here, FIG. 15 illustrates an example of how the actuator 22 moves the movable section 20 to the initial position. FIG. 15A is an illustration of a state of the vibration damper 11 before the calibration processing starts. FIG. 15B is an illustration of a state of the vibration damper 11 that has moved the movable section 20 to the initial position after the starting of the calibration process. As illustrated in FIG. 15A, the actuator 22 is not powered before the calibration processing is started, which means that no drive force is generated. In this state, the image capturing device 10 mounted on the vibration damper 11 is lowered down to be adjacent to the top of the housing 21. At this time, the force (mg) represented by the product of the mass of the image capturing device 10 and the gravity is applied to the housing 21. As illustrated in FIG. 15B, the image capturing device 10 is lifted up to the initial position which is the approximate center position of the movable range by the movement of the movable section 20. In this case, the force to lift up the movable section 20 is adjusted to be equal to the above-described force (mg), thereby controlling the movable section 20 to be stopped at the initial position.

Figure 16:
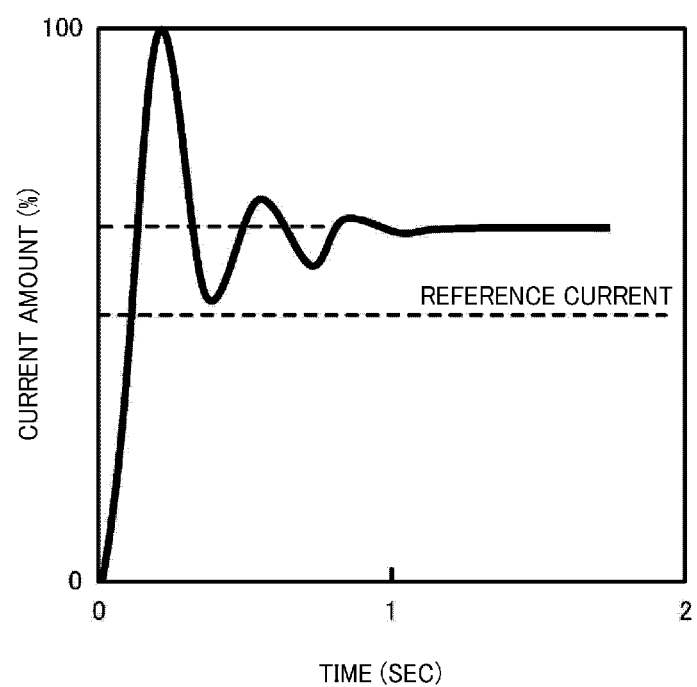
FIG. 16 is a graph of a change in amount of current input to the actuator after calibration processing is started.

Referring again to FIG. 14, in step S1420, the vibration damper 11 waits until the specified time (for example 1 second) elapses after the start of calibration processing. FIG. 16 is a graph of a change in amount of electric current input to the actuator 22 after the start of the calibration processing. In FIG. 16, 100% indicates a state in which the maximum amount of electric current flows.

In FIG. 16, when the calibration processing starts, the amount of electric current rapidly increases to nearly 100%, and the movable section 20 mounted with the image capturing device 10 is quickly moved upward. Thereafter, when the movable section 20 transits to the stationary state at the approximate center position of the movable range, the vertical movement thereof is repeated and the amount of electric current converges at a certain value after about 1 second. The specified time in step S1420 of FIG. 14 corresponds to the time until the amount of electric current converges to the certain value. Rising beyond a certain value is called $B!H (Bovershoot $B!I (B, and lowering below a certain value by repeated vertical movements is called undershoot.

In step S1425, the vibration damper 11 acquires, as an output value, the amount of electric current flowing through the actuator 22 when the amount of electric current converges to the certain value and becomes stable. For such an output value, the measured amount of electric current may be used as is. Alternatively, a plurality of measurement operations is performed and the average value of the measured values may be used. After acquiring the output value, the vibration damper 11 determines whether the output value is within the range of the predetermined reference electric current. When the output value is outside the range, the vibration damper 11 determines whether the output value exceeds or falls below the range of the reference electric current.

When determining that the output value exceeds the range of the reference current, the vibration damper 11 recognizes that the mass of the image capturing device 10 is large outside the reference mass range. When determining that the output value falls below the range of the reference current, the vibration damper 11 recognizes that the mass of the image capturing device 10 is small outside the range of the reference mass. In step S1430, the control parameter is changed according to whether the image capturing device 10 is heavy or light. Further, the vibration damper 11 changes the control parameter according to the mass. Alternatively, in some embodiments, the control parameter may be changed according to whether the image capturing device 10 is heavy or light. Alternatively, in some other embodiments, the control parameter may be changed depending on the mass when the image capturing device 10 is heavy or light. When the control parameter is changed according to the mass, a range of the mass is set and the vibration damper 11 changes the control parameter corresponding to the range of the mass that the acquired output value falls within. After the control parameter is changed, the process proceeds to step S1435 to end the calibration processing.

When the calibration processing is completed or when the calibration mode is OFF, the vibration damper 11 becomes a state (translational control preparation state) in which the correction process for the transitional movement can be executed in step S1440. The vibration damper 11 determines whether or not to execute the correction process in step S1445. The correction process of the translational movement can be determined according to whether or not the translational control is set ON. When the translational control is OFF ($B!H (BNO $B!I (B at S1445), the process returns to step S1440 to determine whether the transitional control is ON again. In contrast, when the translational control is ON ($B!H (BYES $B!I (B at S1445), the process proceeds to step S1450 to start the translational control. When the translational control is completed in step S1455, the vibration damper 11 determines whether power is OFF at S1460. When power is ON ($B!H (BNO $B!I (B at S1460), the process returns to step S1440. When power is OFF ($B!H (BYES $B!I (B at S1460), the process ends.

Figure 17:
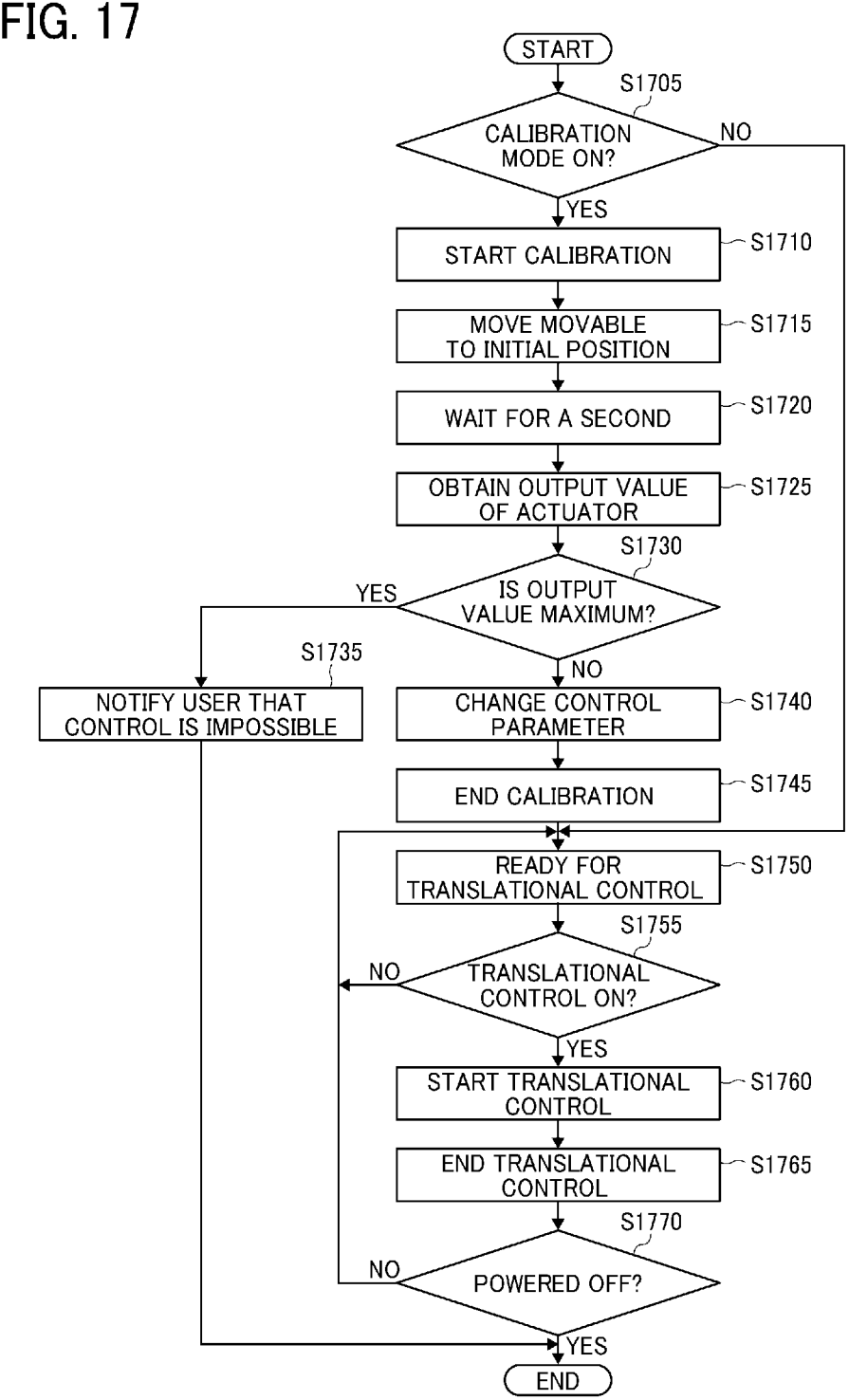
FIG. 17 is a flowchart of processing according to a third Example performed by the vibration damper.
Figure 18:
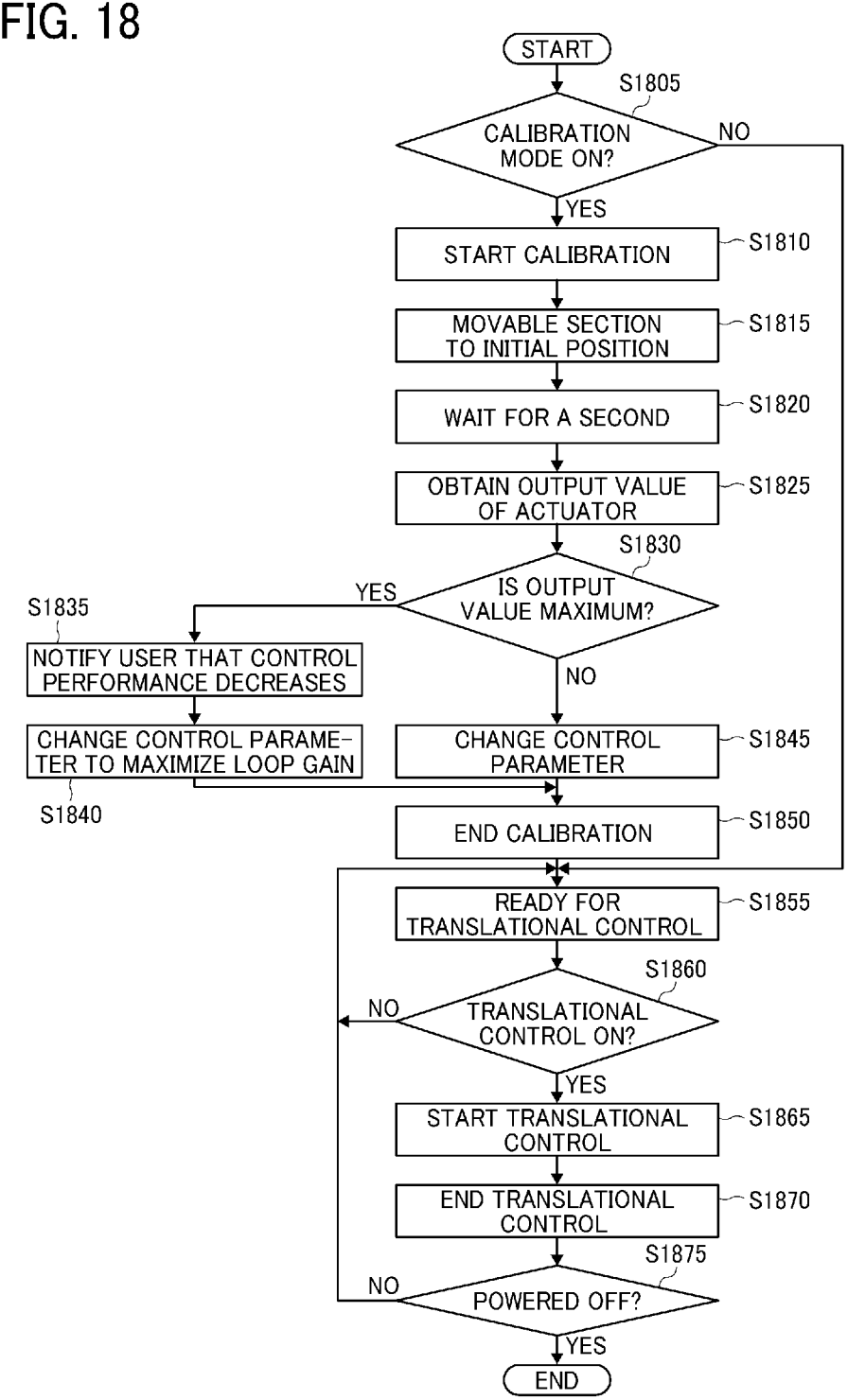
FIG. 18 is a flowchart of processing according to a fourth Example performed by the vibration damper.

The cases where the process executed by the vibration damper 11 including the selector 14 and the output value acquisition section are described above, referring to FIG. 14. The following describes another example of the process executed by the vibration damper 11, referring to FIGS. 17 and 18. FIG. 17 is a flowchart of an example of processing that includes notifying the user that the vibration damper 11 is uncontrollable when the output value reaches the upper limit (maximum current amount) and returning to the power ON state. FIG. 18 is a flowchart of an example of processing that includes notifying that the control performance decreases when the output value reaches the maximum current amount and changing the control parameter to obtain maximum loop gain. To notify the user, the vibration damper 11 may include a notifier (the computing chip 30).

FIG. 17 is a flowchart of an example of processing that includes notifying that the vibration damper 11 is uncontrollable. Such a notification process is performed because it is difficult to adjust the amount of electric current due to the output value having reached the maximum electric-current amount. FIG. 18 is a flowchart of an example of processing that includes notifying that the control performance decreases and performing a maximum level of control. Such processes are performed because it is difficult to adjust the amount of electric current due to the output value having reached the maximum amount of electric current, but some control is possible.

Referring to FIG. 17, the vibration damper 11, which is mounted with the battery 13, starts the processing when powered on by the user $B!G (Bs pressing the power key. Alternatively, in some embodiments, the vibration damper 11 may be powered on in response to an input of a signal transmitted from an external device connected with the vibration damper 11 via a network or through a wired connection. In step S1705, the vibration damper 11 determines whether the calibration mode is ON or not. When the calibration mode is ON ($B!H (BYES $B!I (B at S1705), the process proceeds to step S1710. When the calibration mode is OFF ($B!H (BNO $B!I (B at S1705), the process proceeds to step S1750.

The vibration damper 11 starts a calibration process in step S1710. The actuator 22 moves the movable section 20 to the initial position in step S1715. In step S1720, the vibration damper 11 waits until the specified time (for example 1 second) elapses after starting the calibration process. In step S1725, the vibration damper 11 acquires, as an output value, the amount of electric current flowing through the actuator 22 when the amount of electric current converges to the certain value and becomes stable. For such an output value, the measured amount of electric current may be used as is. Alternatively, a plurality of measurement operations is performed and the average value of the measured values may be used.

In step S1730, the vibration damper 11 determines whether the output value reaches the maximum electric-current amount. When the output value reaches the maximum electric-current amount ($B!H (BYES $B!I (B at S1730), the process proceeds to step S1735 to notify that the vibration damper 11 is uncontrollable by, for example, lighting a warning lamp or displaying an error. The present disclosure is not limited to the above-described manner as long as the notification that the vibration damper 11 is uncontrollable is provided. After the provision of the notification, the processing ends. More specifically, the vibration damper 11 is powered ON again to start processing in step S1705.

In contrast, when the output value falls below the maximum electric-current amount ($B!H (BNO $B!I (B at S1730), the process proceeds to step S1740, and after acquiring the output value, the vibration damper 11 determines whether the output value is within the range of the predetermined reference electric current. When the output value is outside the range, the vibration damper 11 determines whether the output value exceeds or falls below the range of the reference electric current. When the vibration damper 11 determines that the output value exceeds the range of the reference electric current, it is recognized that the mass of the image capturing device 10 is heavy. When the vibration damper 11 determines that the output value falls below the range of the reference electric current, it is recognized that the mass of the image capturing device 10 is lightweight. Then, the vibration damper 11 changes the control parameter depending on whether the image capturing device 10 is heavy or light. Further, the vibration damper 11 changes the control parameter according to the mass. Alternatively, in some embodiments, the control parameter may be changed according to whether the image capturing device 10 is heavy or light. Alternatively, in some other embodiments, the control parameter may be changed depending on the mass when the image capturing device 10 is heavy or light. When the control parameter is changed according to the mass, a range of the mass is set and the vibration damper 11 changes the control parameter corresponding to the range of the mass that the acquired output value falls within. After the control parameter is changed, the process proceeds to step S1745 to end the calibration.

In step S1750, the vibration damper 11 is in preparation for transitional control. In step S1755, the vibration damper 11 determines whether the transitional control is ON. When the translational control is OFF ($B!H (BNO $B!I (B at S1755), the process returns to step S1750 to determine whether the transitional control is ON again. In contrast, when the translational control is ON ($B!H (BYES $B!I (B at S1755), the process proceeds to step S1760 to start the translational control. When the translational control is completed in step S1765, the vibration damper 11 determines whether power is OFF. When power is ON ($B!H (BNO $B!I (B at S1770), the process returns to step S1750. When power is OFF ($B!H (BYES $B!I (B at S1770), the ends.

As described above, when the actuator 22 has an output value having reached the maximum current amount, the vibration damper 11 notifies the user that the transitional control cannot be performed. With this configuration, the user can recognize whether the vibration damper 11 is usable without preliminarily checking whether the image capturing device 10 is mountable on the vibration damper 11.

Referring to FIG. 18, the vibration damper 11, which is mounted with the battery 13, starts the processing when powered on by the user $B!G (Bs pressing the power key. Alternatively, in some embodiments, the vibration damper 11 may be powered on in response to an input of a signal transmitted from an external device connected with the vibration damper 11 via a network line or through a wired connection. In step S1805, the vibration damper 11 determines whether the calibration mode is ON or not. When the calibration mode is ON (Yes in step S1805), the process proceeds to step S1810. When the calibration mode is OFF (No in step S1805), the process proceeds to step S1855.

The vibration damper 11 starts the calibration processing in step S1810. The actuator 22 moves the movable section 20 to the initial position in step S1815. In step S1820, the vibration damper 11 waits until the specified time (for example 1 second) elapses after starting the calibration process. In step S1825, the vibration damper 11 acquires, as an output value, the amount of electric current flowing through the actuator 22 when the amount of electric current converges to the certain value and becomes stable. For such an output value, the measured amount of electric current may be used as is. Alternatively, a plurality of measurement operations may be performed and the average value of the measured values may be used.

In step S1730, the vibration damper 11 determines whether the output value reaches the maximum electric-current amount. When the output value reaches the maximum electric-current amount, the process proceeds to step S1835 to notify that the vibration damper 11 is uncontrollable by, for example, lighting a warning lamp or displaying an error. The present disclosure is not limited to the above-described manner as long as the notification that the control performance decreases is provided. After such a notification, the vibration damper 11 changes the control parameter to obtain maximum loop gain in step S1840. Then, the calibration processing ends in step S1850.

In contrast, when the output value falls below the maximum electric-current amount, the process proceeds to step S1845. Then, the vibration damper 11 determines whether the output value is within the range of the predetermined reference current after acquiring the output value. When the output value is outside the range, the vibration damper 11 determines whether the output value exceeds or falls below the range of the reference electric current. When determining that the output value exceeds the range of the reference current, the vibration damper 11 recognizes that the mass of the image capturing device 10 is large. When determining that the output value falls below the range of the reference current, the vibration damper 11 recognizes that the mass of the image capturing device 10 is small. Then, the vibration damper 11 changes the control parameter depending on whether the image capturing device 10 is heavy or light. Further, the vibration damper 11 changes the control parameter according to the mass. Alternatively, in some embodiments, the control parameter may be changed according to whether the image capturing device 10 is heavy or light. Alternatively, in some other embodiments, the control parameter may be changed depending on the mass when the image capturing device 10 is heavy or light. When the control parameter is changed according to the mass, a range of the mass is set and the vibration damper 11 may change the control parameter corresponding to the range of the mass that the acquired output value falls within. After the control parameter is changed, the process proceeds to step S1850 to end the calibration processing.

In step S1850, the vibration damper 11 is in preparation for transitional control. In step S1860, the vibration damper 11 determines whether the transitional control is ON. When the translational control is OFF, the process returns to step S1855 to determine whether the transitional control is ON again. In contrast, when the translational control is ON, the process proceeds to step S1865 to start the translational control. When the translational control is completed in step S1870, the vibration damper 11 determines whether power is OFF. When power is ON, the process returns to step S1855. When power is OFF, the process proceeds to step S1880 to end the processing of the vibration damper 11.

As described above, when the output value of the actuator 22 reaches the maximum electric-current amount, the vibration damper 11 notifies that the control performance decreases. Subsequently, the vibration damper 11 performs the transitional control with the maximum loop gain. This configuration allows exhibiting damping effects against some degrees of vibration even with a heavy image capturing device 10 mounted on the vibration damper 11.

Note that, the outputs of the gyro sensor 28 and the acceleration sensor 29 include low-frequency fluctuation components whose output changes even without movement. If the control is performed without removing the fluctuation component from the output, the movable section 20 might abut (come in contact) with the top of the housing 21 due to erroneous correction. For this reason, preferably, the HPF (simply referred to as a filter) serving to process, for example, the detected acceleration is used to remove the fluctuation components from the output.

However, as a side effect when using such a filter, the output itself of the detected vibration movement might be removed in some cases, and in particular, the movement (fluctuation) of the low frequency vibration is easily removed. To avoid such a situation, preferably, a degree of filtering is reduced to remove the fluctuation component within a range in which the movable section 20 does not come in contact with the top of the housing 21, and to appropriately correct the fluctuation at the same time. The filter transmits the high frequency component and removes the low frequency component, but by changing the setting of the conditions, the degree of filtering can be changed.

For example, in the case of medium-amplitude low frequency vibration, the movable section 20 might come in contact with the top of the housing 21 unless the degree of filtering is increased. By contrast, in the case of small-amplitude low frequency vibration, the degree of filtering is reduced to increase the correction performance. In view of the above, changing the degree of filtering with amplitude for vibrations of the same low frequency can increase the correction performance.

Figure 19:
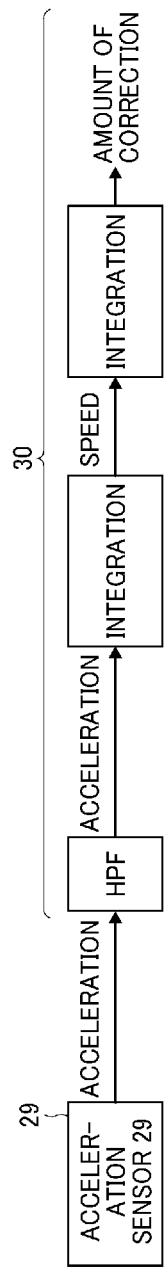
FIG. 19 is a block diagram of another example of signal transmission in correction of the translational movement of the image capturing device.

FIG. 19 is an illustration of another example of the correction processing of the transitional movement. In this example, the vibration damper 11 removes the fluctuation component from the output value using the HPF to convert the output value into an appropriate correction amount. Since the contact of the movable section 20 with the top of the housing 21 mainly relates to the translational movement, only the translational movement will be described.

First, the acceleration sensor 29 detects the acceleration, and outputs the detected acceleration to the computing chip 30. The computing chip 30 also functions as a computing processor as well as a controller in the present embodiment. The computing chip 30 has an HPF for removing vibrations within the range set as the above-described function, to remove the low frequency fluctuation component included in the acceleration output from the acceleration sensor 29 using the HPF. The computing chip 30 serves to perform an integration calculation and integrates the acceleration from which the low frequency fluctuation component has been removed by time once, obtaining the speed. Then, the computing chip 30 integrates the obtained speed by time once and calculates the amount of displacement, thus obtaining the amount of correction by the amount of displacement. The amount of correction is obtained as the amount of displacement in a direction to cancel the displacement.

Figure 20:
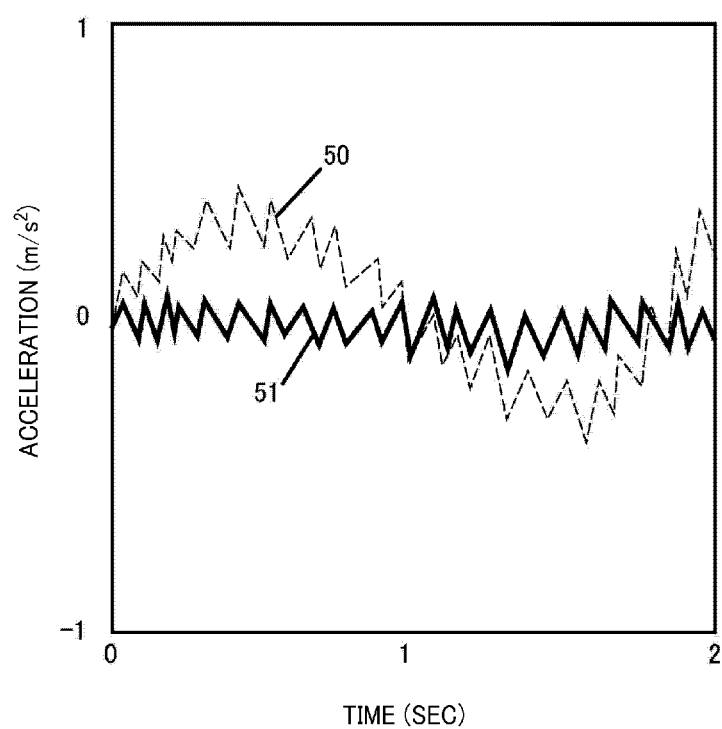
FIG. 20 is a graph of an example of acceleration before passing through a high-pass filter (HPF) and an example of acceleration after passing through the HPF.

FIG. 20 is a graph of the example of the acceleration 50 to be filtered by the HPF of the computing chip 30 in FIG. 19 and an example of the acceleration 51 filtered by the HPF.

In FIG. 20, the horizontal axis represents time (sec) and the vertical axis represents acceleration (m/s2). The acceleration 50 to be filtered by the HPF is represented by a waveform having a predetermined amplitude due to the influence of the fluctuation component. However, the acceleration 51 filtered by the HPF has the low-frequency fluctuation components removed and the amplitude reduced.

Figure 21:
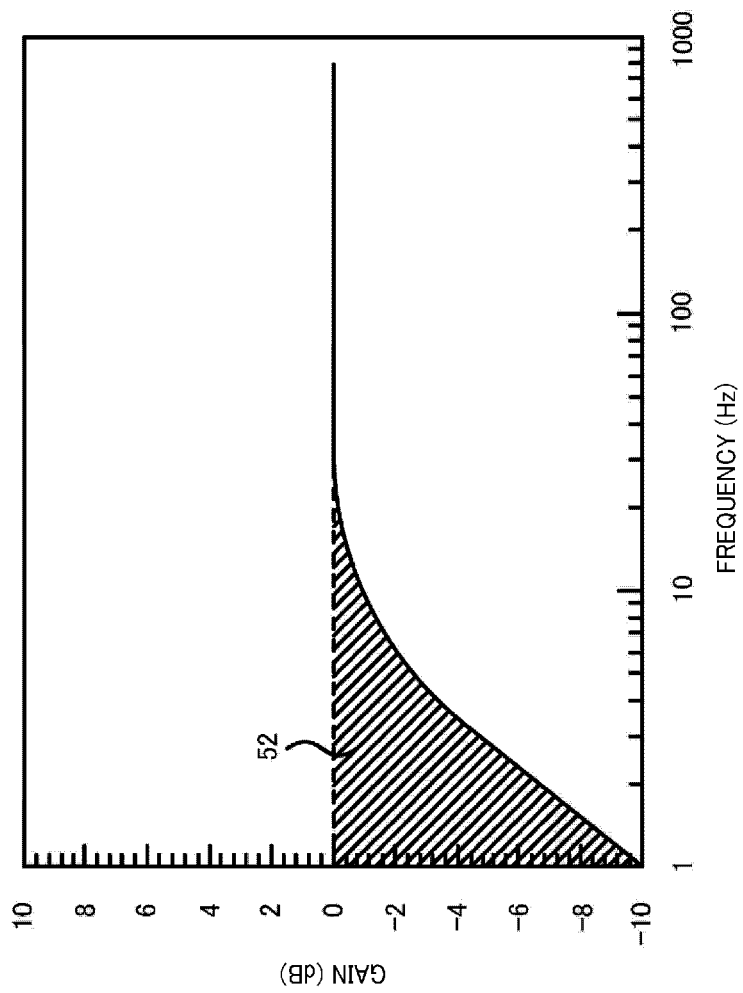
FIG. 21 is a graph of filtering characteristics of the HPF.

FIG. 21 is a graph of filter characteristics of the HPF. In FIG. 21, the horizontal axis represents the frequency (Hz), and the vertical axis represents the gain decibel (dB) which is the characteristics of the filter. In FIG. 21, the hatched area 52 represents an area in which the gain is smaller than 0 dB, which means that the filtering performance deteriorates in the hatched area 52. The filtering performance deteriorates at low frequencies below 10 Hz in which the gain significantly decreases. The frequency at which the gain begins to significantly reduce is called the cutoff frequency.

As illustrated in FIG. 20, with a reduction in amplitude of acceleration due to the effect of the HPF, the amount of correction to be calculated decreases. Accordingly, what is to be corrected fails to be corrected, resulting in insufficient correction. The degree of insufficient correction increases as the effect of the HPF increases (the degree of filtering is increased). The example illustrated in FIG. 21 represents a higher degree of insufficient correction. This means that a force to remove the low-frequency fluctuation component is great, that is, the degree of filtering of the HPF is high.

Figure 22:
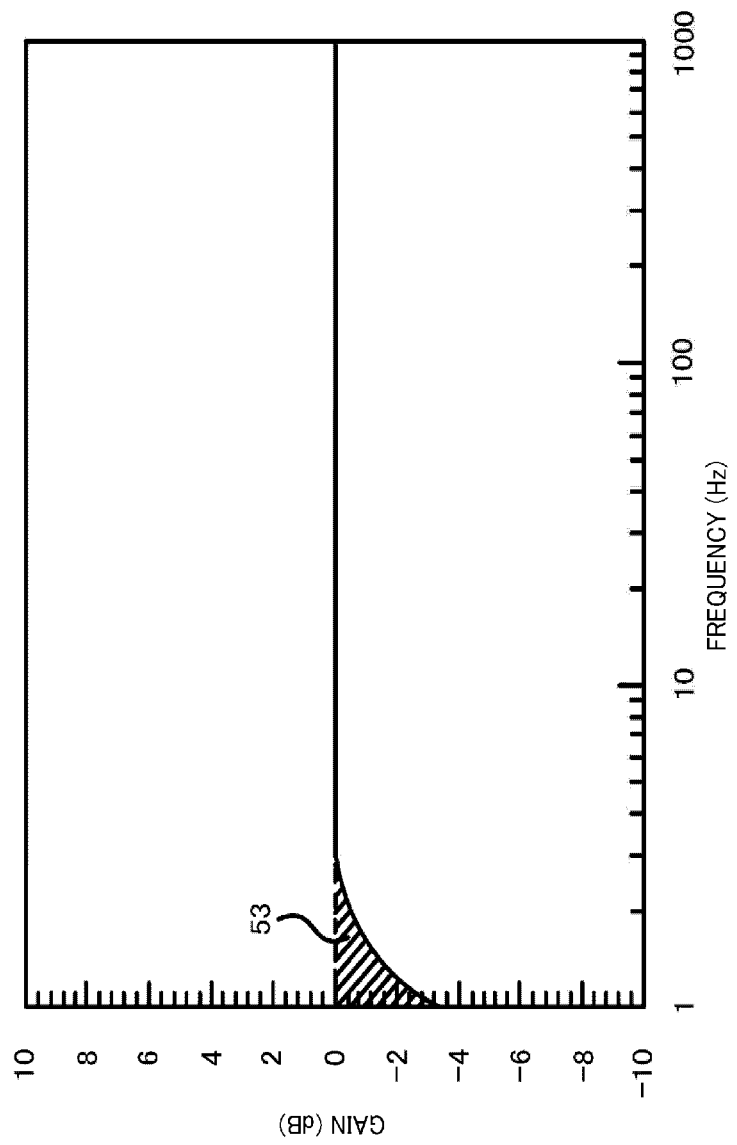
FIG. 22 is a graph of the characteristics when the HPF cutoff frequency is lowered.

FIG. 22 is a graph of the filter characteristics when the cutoff frequency of the HPF is reduced. Similarly to FIG. 21, the horizontal axis and the vertical axis of FIG. 22 also represent frequency and gain, respectively. In FIG. 22, a hatched area 53 indicates an area in which the filtering performance of the HPF deteriorates. When the cutoff frequency is reduced, the area 53 becomes smaller than the area 52 in FIG. 21. The fact that the hatched area is small refers to that the degree of insufficient correction is low and the effect of the HPF is small. Thus, contrary to the example in FIG. 21, the degree of filtering of the HPF is low in FIG. 22. In view of the above, the HPF is set within the above-described range by changing the cutoff frequency, thereby changing the degree of filtering of the HPF.

In the above description, cases where the degree of filtering of the filter is changed by changing the setting of the cutoff frequency are given. The following further describes in detail when to increase or reduce the cutoff frequency and how much degree of cutoff frequency to be increased or reduced.

Figure 23:
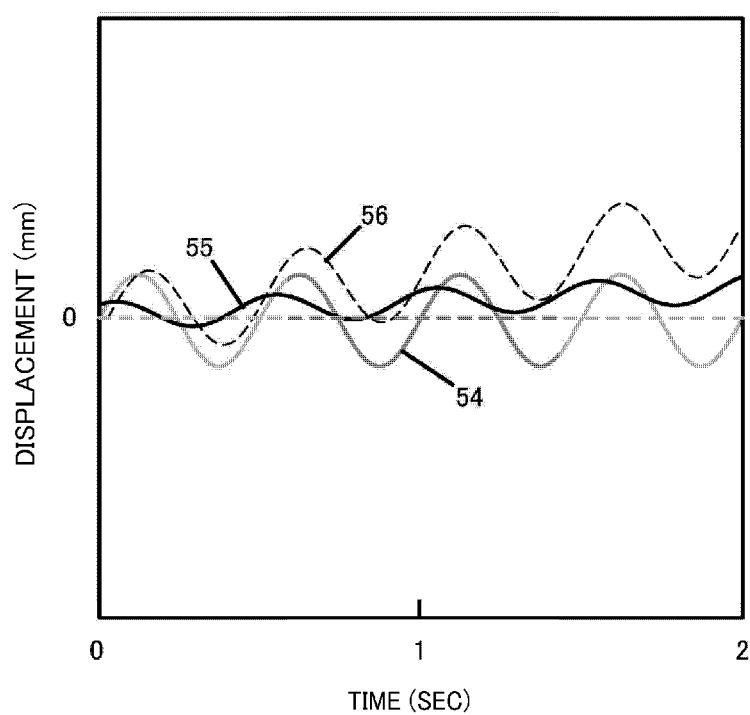
FIG. 23 is a graph of each correction target value when a 2 (hertz) Hz swing occurs.

FIG. 23 is a graph of an appropriate correction target value 54 with a vibration of 2 Hz, a correction target value 55 obtained when the HPF having an increased degree of filtering in FIG. 21 is used, and a correction target value 56 obtained when the HPF having a reduced degree of filtering in FIG. 22 is used. In FIG. 23, the horizontal axis represents time (sec) and the vertical axis represents displacement (mm). The correction target value is the movement target value of the movable section 20 based on the amount of correction. The appropriate correction target value 54 is a correction target value for correcting only the vibration of 2 Hz.

In the example in FIG. 23, the amount of deviation which is a difference between the correction target value 55 and the appropriate correction target value 54 is small. However, the difference in phase and amplitude between the waveform of the correction target value 55 and the waveform of the appropriate correction target value 54 is large. On the other hand, the amount of deviation between the correction target value 56 and the appropriate correction target value 54 increases over time. The difference in phase and amplitude between the waveform of the correction target value 56 and the waveform of the appropriate correction target value 54 is small.

Figure 24:
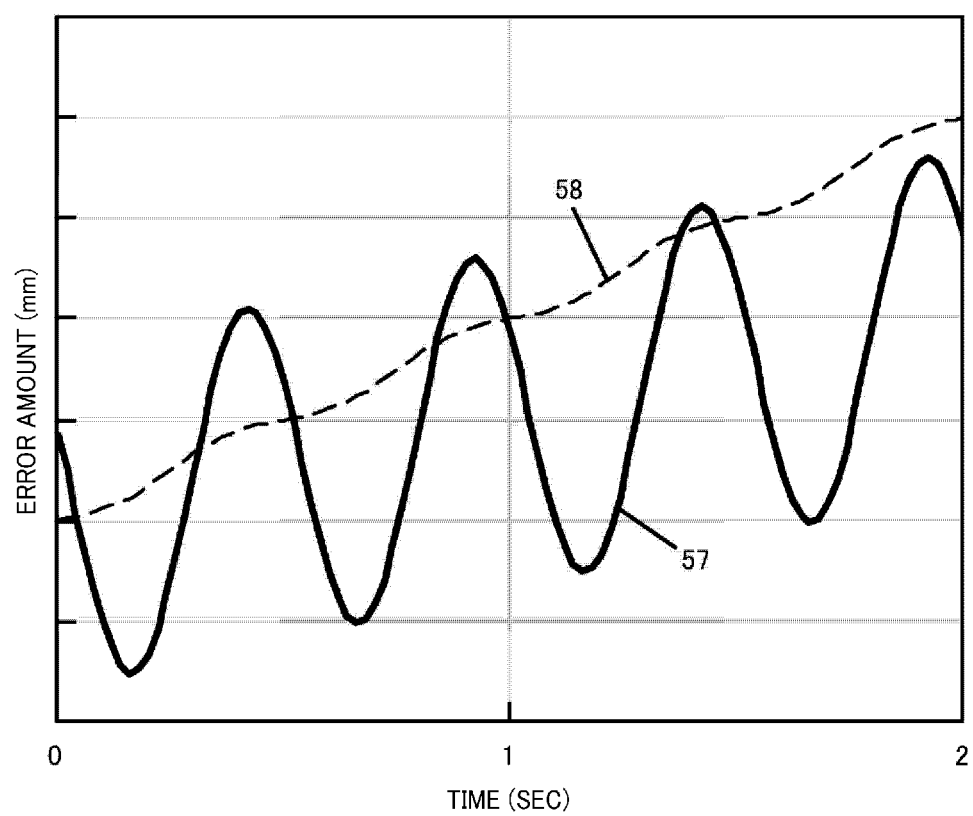
FIG. 24 is a graph of an error amount from a correct correction target value.

FIG. 24 is a graph of an error amount from an appropriate correction target value. In FIG. 24, the horizontal axis represents time (sec) and the vertical axis represents error amount (mm). The error amount 57 indicates the difference between the appropriate correction target value 54 and the correction target value 55. The error amount 58 indicates the difference between the appropriate correction target value 54 and the correction target value 56. The error amount 57 is an error amount obtained by using the HPF having a high degree of filtering, in which the amount of deviation in one direction is small over time, but the error amount periodically increases and decreases. In contrast, the error amount 58 is an error amount obtained by using a HPF having a low degree of filtering, in which the error amount deviates in one direction over time, but the rate of periodic increase and decrease of the error amount is low.

The user is more likely to feel that correction is insufficient with the HPF having a high degree of filtering that indicates the error amount 57 having the high rate of periodic increase and decrease. Accordingly, the HPF having a low degree of filtering that indicates the error amount 58 having the low rate of periodic increase and decrease is preferably used.

Figure 25:
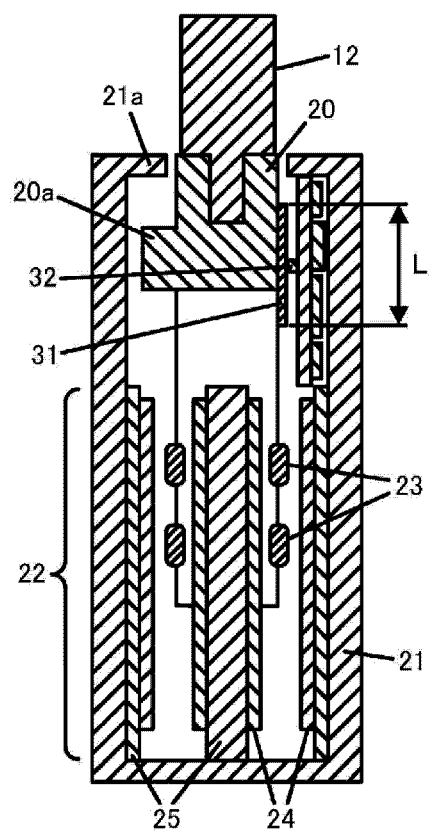
FIG. 25 is an illustration of a movable range of the movable section.

FIG. 25 is an illustration of a movable range L of the movable section 20. The movable section 20 includes a stopper 20a projecting toward the inner surface of the side portion of the housing 21, which comes in contact with the inner surface of the top 21a of the housing 21 to stop the movable section 20. The movable section 20 has the magnetic tape 31 affixed to the side surface of the movable portion 20. The magnetic sensor 32 detects magnetism from the magnetic tape 31 opposed to the magnetic sensor 32 to detect the vertical-directional movement of the movable section 20. For example, the computing chip 30 receives the amount of movement of the movable section 20 detected by the magnetic sensor 32 to compute the current position of the movable section 20 based on the center position of the magnetic tape 31 as the initial position. In the example illustrated in FIG. 25, the movable range L is equal to the length of the magnetic tape 31 in the vertical direction. However, the present disclosure is not limited to this configuration. The movable range L may have any length as long as the length of the movable range L is shorter than the length of the magnetic tape 31.

Figure 26:
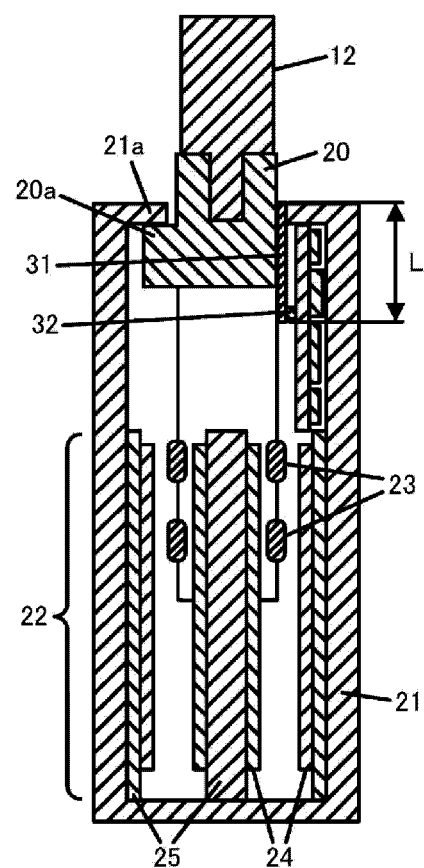
FIG. 26 is an illustration of the movable section that is moved to contact the upper limit of the movable range.

FIG. 26 is an illustration of a state in which the movable section 20 of FIG. 25 is moved to the upper limit of the movable range L and the stopper 20a is in contact with the top 21a of the housing 21. As described above, the HPF having a low filtering degree is preferably used. The correction target value 56 obtained by using the HPF having a low filtering degree deviates over time, which does not matter as long as the stopper 20a does not come in contact with the top 21a of the housing 21. That is, any cutoff frequency may be set as long as the movable section 20 can move within the movable range L. Note that, with a reduction in cutoff frequency to reduce the degree of filtering of a HPF, the correction effect can be enhanced.

Figure 27:
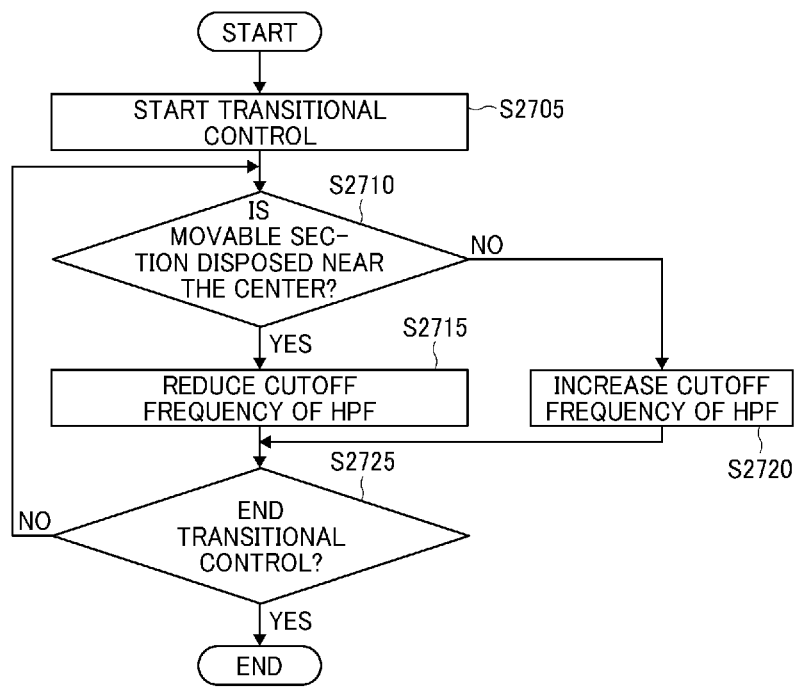
FIG. 27 is a flowchart of processing according to a fifth Example performed by the vibration damper.

FIG. 27 is a flowchart of processing according to the fifth Example performed by the vibration damper 11. The vibration damper 11, which is mounted with the battery 13, starts the control when powered on by turning on the power key. The power supply can be turned on by pressing the power key. Alternatively, in some embodiments, the vibration damper 11 may be powered on in response to an input of a signal transmitted from an external device connected with the vibration damper 11 via a network line or through a wired connection. When powered on, the vibration damper 11 starts the transitional control in step S2705.

In step S2710, the computing chip 30 determines whether or not the movable section 20 is positioned in the vicinity of the center of the movable range L. When the movable section 20 is positioned in the vicinity of the center of the movable range L, the stopper 20a has a sufficient distance to come in contact with the top 21a of the housing 21, which allows lowering the cutoff frequency of the HPF in step S2715 to thus enhance the correction effect.

By contrast, when the movable section 20 is not positioned in the vicinity of the center of the movable range L, the stopper 20a is near the top 21a of the housing 21. To prevent the stopper 20a from coming in contact with the top 21a of the housing 21, the vibration damper 11 increases the cutoff frequency of the HPF in step S2720. In step S2725, the vibration damper 11 determines whether to end the transitional control. When the transitional control does not end, the process returns to step S2710 to repeat the processes in steps S2710 through S2725 for each periodic computation for control. When the transitional control ends, the process proceeds to step S2730 to end the processing in FIG. 27.

Figure 28B:
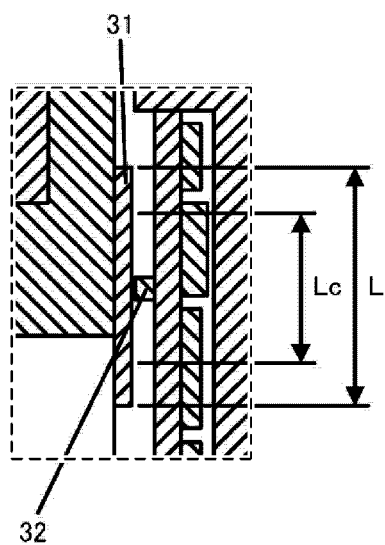
FIG. 28 is an illustration of the position of the movable section within the movable range.

FIG. 28 is an illustration of a position of the movable section 20 within the movable range L. The movable range L is the vertical length of the magnetic tape 31. The position of the movable section 20 is defined as the position of the magnetic sensor 32 on the magnetic tape 31. The vicinity of the center mentioned in step S2710 of FIG. 27 is defined as a range Lc that is approximately 70% of the vertical length ranging from the center of the movable range L to each end of the magnetic tape 31. The range Lc in the vicinity of the center of the movable range L is not limited to the above-described range, and may be approximately 60% or 80% in the vertical direction as long as the range in the vicinity of the center of the movable range L can be defined.

That is, the magnetic sensor 32, which is positioned within the range Lc, can be determined to be positioned in the vicinity of the center of the movable range L. Further, the magnetic sensor 32, which is positioned outside the range Lc, can be determined not to be disposed in the vicinity of the center of the movable range L.

In the example illustrated in FIG. 27, increasing the cutoff frequency of the HPF prevents the stopper 20a from coming in contact with the top 21a of the housing 21. The present disclosure is not limited to such a method to prevent the contact of the stopper 20a with the top 21a of the housing 21. Alternatively, for example, the cutoff frequency corresponding to the HPF having the high filtering degree is set as the initial value, and the vibration damper 11 returns the cutoff frequency to the initial value when the movable section 20 is not positioned in the vicinity of the center of the movable range L. This is because returning the cutoff frequency to the initial value increases the cutoff frequency.

Figure 29:
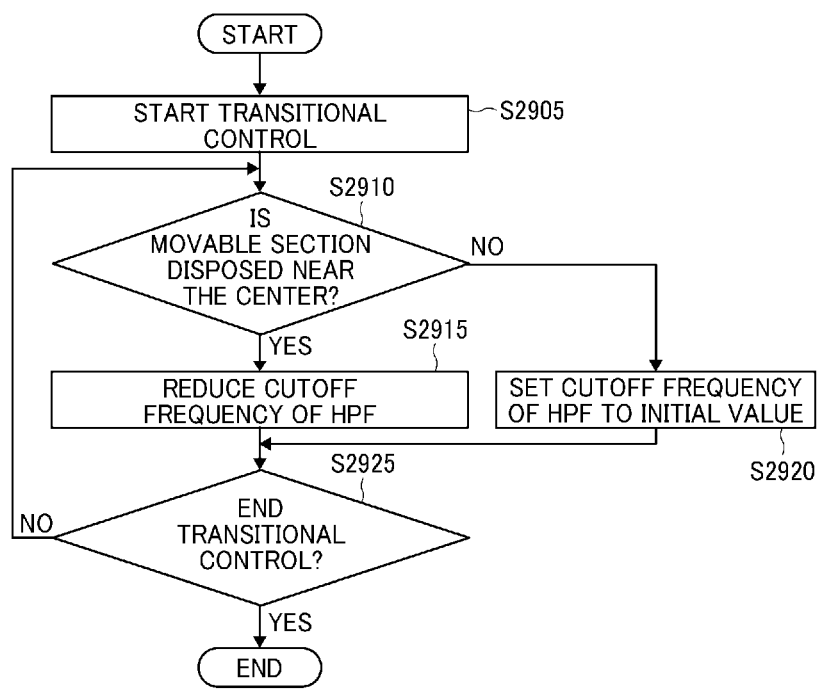
FIG. 29 is a flowchart of processing according to a sixth Example performed by the vibration damper.

FIG. 29 is an illustration of processing according to the sixth Example performed by the vibration damper 11. The processes in step S2905 through step S2915 are the same as the processes in step S2705 through step S2715 in FIG. 27. In step S2920, the computing chip 30 of the vibration damper 11 sets the cutoff frequency of the HPF to the initial value. The processes in steps S2925 and following the step S2920 are the same as processes in steps S2725 and step.

The vibration damper 11 performs the transitional control according to the position of the movable section 20, i.e., depending on whether the movable section 20 is positioned in the vicinity of the center of the movable range L. Alternatively, the vibration damper 11 may perform the transitional control based on the acceleration and the speed acquired by the acceleration sensor 29 and the computing chip 30, respectively. Alternatively, in some embodiments, the vibration damper 11 may perform the translational control based on a set of two state quantities, such as the position and speed, the position and acceleration, or the speed and acceleration of the movable section 20. Alternatively, in some other embodiments, the vibration damper 11 may perform the translational control based on a set of three state quantities such as the position, speed, and acceleration of the movable section 20.

Figure 30:
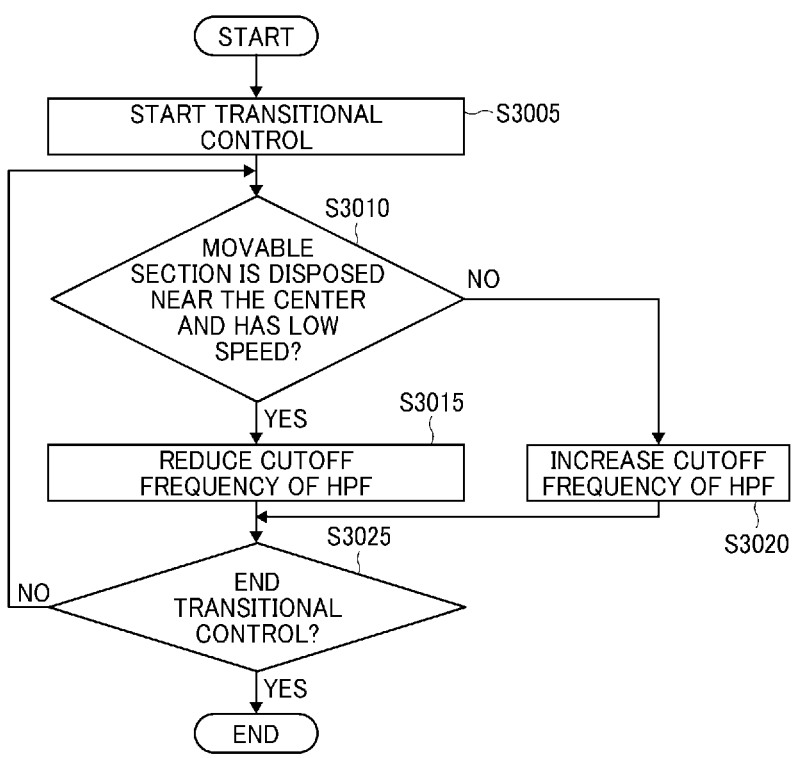
FIG. 30 is a flowchart of processing according to a seventh Example performed by the vibration damper.

FIG. 30 is a flowchart of processing according to the seventh example performed by the vibration damper 11. In this example, the vibration damper 11 performs the transitional control based on the set of two quantities, i.e., the position and speed of the movable section 20. The processes in steps S3005 are the same as the processes in steps and S2705 in FIG. 27. In step S3010, the computing chip 30 determines whether the movable section 20 is position in the vicinity of the center of the movable range L, and the speed is smaller than a predetermined value. Similarly to the cutoff frequency, the predetermined value of the speed can be set as an appropriate value. When the movable section 20 is positioned in the vicinity of the center of the movable range L and the speed is low, the process proceeds to step S3015. When the movable section 20 is not disposed in the vicinity of the center or the speed is high, the process proceeds to step S3020.

In step S3015, the vibration damper 11 reduces the cutoff frequency of the HPF. This is because, when the movable section 20 is disposed in the vicinity of the center of the movable range L, and having a low speed, the stopper 20a is unlikely to come in contact with the top 21a of the housing 21 even with an amount of deviation to a certain degree. Thus, the error amount can be reduced. In step S3020, on the other hand, the vibration damper 11 increases the cutoff frequency of the HPF. With such a process, the contact of the stopper 20a is prevented because the stopper 20a is more likely to come in contact with the top 21a of the housing 21. The processes in steps S3025 and are the same as processes in steps S2725 and step in FIG. 27.

In the example illustrated in FIG. 27, the vibration damper 11 increases or reduces the cutoff frequency depending on whether or not the movable section 20 is positioned in the vicinity of the center of the movable range L. However, no limitation is intended therein. Alternatively, the vibration damper 11 may increase the cutoff frequency in proportion to the distance between the position of the movable section 20 and the center of the movable range L.

Figure 31:
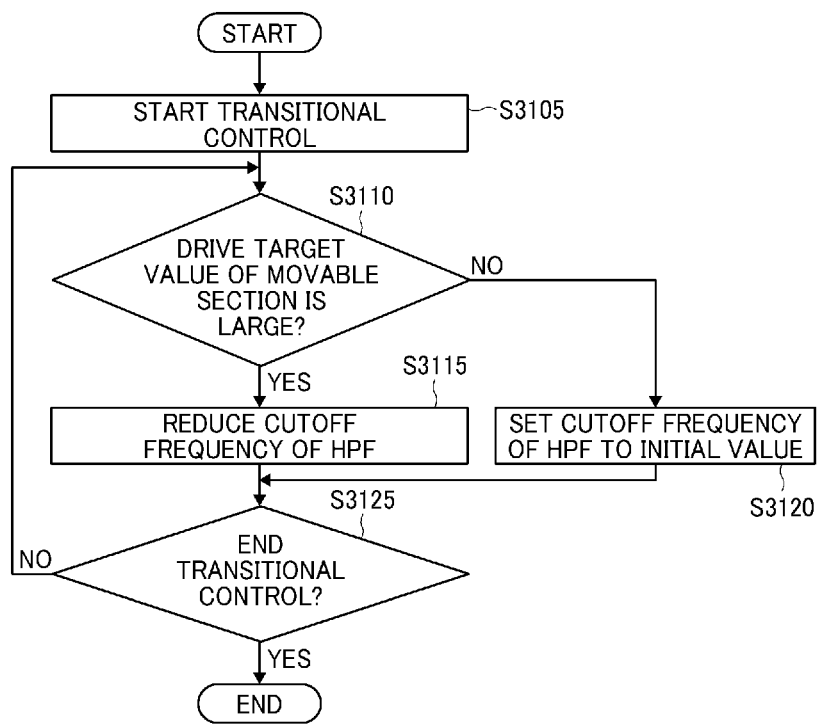
FIG. 31 is a flowchart of processing according to an eighth Example performed by the vibration damper.

In addition, instead of the movable range L of the movable section 20, the vibration damper 11 may increase or decrease the cutoff frequency according to the movement target value of the movable section 20 that is determined by the amount of correction. FIG. 31 is a flowchart of processing according to the eighth example performed by the vibration damper 11. The processes in steps and S3105 are the same as processes in steps and step S2705 in FIG. 27.

In step S3110, the computing chip 30 of the vibration damper 11 determines whether the movement target value of the movable section 20 is equal to or greater than a predetermined value. The predetermined value of the movement target value may be set as an appropriate value. When the movement target value of the movable section 20 is greater than the predetermined value, the process proceeds to step S3115. When the movement target value of the movable section 20 is lower than the predetermined value, the process proceeds to step S3120.

In step S3115, the vibration damper 11 reduces the cutoff frequency of the HPF. This is because, when the movement target value of the movable section 20 is greater than the predetermined value, the stopper 20a is unlikely to come in contact with the top 21a of the housing 21 even with an amount of deviation to a certain degree. Thus, the error amount can be reduced. In step S3020, on the other hand, the vibration damper 11 increases the cutoff frequency of the HPF. With such a process, the contact of the stopper 20a is prevented because the stopper 20a is more likely to come in contact with the top 21a of the housing 21. The processes in steps S3125 and are the same as processes in steps S2725 and step in FIG. 27. Note that, the width in which the movable section 20 moves changes with the movement target value, and thereby the width in which the movable section 20 moves may be changed by changing the movement target value of the movable section 20.

In view of the above, the controller sets the HPF, i.e., changes the cutoff frequency, according to at least one of the status quantities, such as the acceleration as a detection result, speed and position obtained by the detection result, and the movement target value of the movable section 20. This configuration can improve capability corresponding to vibration of a low frequency. Further, by using two or more values such as position and speed, the vibration damper 11 can achieve more optimal control. Further, the controller changes the cutoff frequency to the initial value, values lower or higher than the initial value according to the detected position of the movable section 20 to obtain the high correction effect of the HPF, thus performs a control operation with high correction effect. This configuration can prevent the stopper 20a of the movable section 20 from coming in contact with the top 21a of the housing 21.

In the above description, the embodiments of the present disclosure have been described as the information processing apparatus, the information processing system, the information processing method, and the non-transitory recording medium storing a program. However, the present disclosure is not limited to the above-described embodiments. Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

REFERENCE SIGNS LIST

10 Image capturing device
11 Vibration damper
12 Tripod screw
13 Battery
20 Movable part
20a Stopper
21 Housing
21a Top
22 Actuator
23 Coil
24 Permanent magnet
25 Iron-plate yoke
26 PCB board
27 Memory
28 Gyro sensor
29 Acceleration sensor
30 Computing chip
31 Magnetic tape
32 Magnetic sensor
40 Person
41 Mountain
42 Image
50, 51 Acceleration
52, 53 Area
54 to 56 Correction target value
57, 58 Error amount

The invention claimed is:

1. A vibration damper comprising:
a movable section movable in at least one direction;
a support section to movably support the movable section;
a vibration detector to detect a vibration received by the vibration damper; and
a computing processor to compute an amount of displacement of the movable section in a first direction, which is associated with the vibration, based on a detection result of the vibration detector,
calculate an amount of correction corresponding to the amount of displacement, and
instruct the support section to move the movable section in a second direction opposite to the first direction based on the amount of correction,
the vibration damper further comprising:
a rotation detector to detect information of a rotational movement around a center of gravity of the vibration damper; and
at least one of:
a memory to store the information of rotational movement detected by the rotation detector; and
a communicator to transmit the information of rotational movement detected by the rotation detector to an external device.

2. The vibration damper according to claim 1, further comprising:
a movement-amount detector to detect an amount of movement of the movable section moved by the support section; and
a controller to perform a feedback control to reduce an amount of difference between the amount of correction computed by the computing processor and the amount of movement detected by the movement-amount detector.

3. The vibration damper according to claim 2,
wherein the controller controls control information to be used in the feedback control, according to quantity of an electronic device to be mounted on the vibration damper.

4. The vibration damper according to claim 3, further comprising:
a selector to select a calibration mode to determine whether to change the control information; and
an output value acquisition section to acquire an output value from the support section having moved the movable section to a predetermined position in response to a selection of the calibration mode by the selector,
wherein the controller calculates the quantity of the electronic device mounted on the vibration damper based on the output value acquired by the output value acquisition section, and determines whether to change the control information based on the quantity calculated by the controller.

5. The vibration damper according to claim 4,
wherein the controller determines whether to change the control information depending on whether the quantity calculated by the controller is within a range of a reference quantity.

6. The vibration damper according to claim 5,
wherein, when determining to change the control information and the quantity calculated by the controller exceeds the range of the reference quantity, the controller changes the control information to increase a gain of the feedback control, and
wherein, when determining to change the control information and the quantity calculated by the controller falls below the range of the reference quantity, the controller changes the control information to reduce the gain of the feedback control.

7. The vibration damper according to claim 4, further comprising a notifier to notify that the controller fails to perform the feedback control when the output value acquired by the output value acquisition section reaches an upper limit of the output value.

8. The vibration damper according to claim 4, further comprising a notifier to notify that an accuracy of the feedback control of the controller decreases when the output value acquired by the output value acquisition section reaches an upper limit of the output value,
wherein the controller changes the control information to maximize a gain of the feedback control.

9. The vibration damper according to claim 2,
wherein the controller changes a setting of an operation corresponding to the detection result of the vibration detector, according to at least one of the detection result of the vibration detector, a state quantity obtained by the detection result, and a movement target value of the movable section based on the amount of correction.

10. The vibration damper according to claim 9,
wherein the operation is to remove a vibration within a set range, and
wherein the controller changes the set range to change the setting of the operation.

11. The vibration damper according to claim 9,
wherein the controller detects a position of the movable section relative to an initial position based on the amount of movement detected by the movement-amount detector.

12. The vibration damper according to claim 11,
wherein the controller changes the setting of the operation to at least one of an initial value, a first value lower than the initial value, and a second value greater than the initial value.

13. The vibration damper according to claim 1,
wherein the at least one direction is a vertical direction, and
wherein the vibration detector detects information of a transitional movement of the vibration damper, as the vibration received by the vibration damper in the vertical direction.

14. The vibration damper according to claim 1,
wherein the rotation detector detects the information of rotational movement while the support section moves the movable section.

15. An electronic device mountable on the vibration damper according to claim 1.

16. The electronic device according to claim 15,
wherein the electronic device is an image capturing device having a thread groove connectable with a tripod stand,
wherein the vibration damper includes a tripod screw to be screwed into the thread groove of the image capturing device.

17. A vibration damper comprising:
a movable section movable in at least one direction;
a support section to movably support the movable section;
a vibration detector to detect a vibration received by the vibration damper; and
a computing processor to compute an amount of displacement of the movable section in a first direction, which is associated with the vibration, based on a detection result of the vibration detector,
calculate an amount of correction corresponding to the amount of displacement, and
instruct the support section to move the movable section in a second direction opposite to the first direction based on the amount of correction,
the vibration damper further comprising:
a movement-amount detector to detect an amount of movement of the movable section moved by the support section; and
a controller to perform a feedback control to reduce an amount of difference between the amount of correction computed by the computing processor and the amount of movement detected by the movement-amount detector,
wherein the controller controls control information to be used in the feedback control, according to quantity of an electronic device to be mounted on the vibration damper,
the vibration damper further comprising:
a selector to select a calibration mode to determine whether to change the control information; and
an output value acquisition section to acquire an output value from the support section having moved the movable section to a predetermined position in response to a selection of the calibration mode by the selector,
wherein the controller calculates the quantity of the electronic device mounted on the vibration damper based on the output value acquired by the output value acquisition section, and determines whether to change the control information based on the quantity calculated by the controller,
wherein the controller determines whether to change the control information depending on whether the quantity calculated by the controller is within a range of a reference quantity,
wherein, when determining to change the control information and the quantity calculated by the controller exceeds the range of the reference quantity, the controller changes the control information to increase a gain of the feedback control, and
wherein, when determining to change the control information and the quantity calculated by the controller falls below the range of the reference quantity, the controller changes the control information to reduce the gain of the feedback control.

18. A vibration damper comprising:
a movable section movable in at least one direction;
a support section to movably support the movable section;
a vibration detector to detect a vibration received by the vibration damper; and
a computing processor to compute an amount of displacement of the movable section in a first direction, which is associated with the vibration, based on a detection result of the vibration detector, calculate an amount of correction corresponding to the amount of displacement, and instruct the support section to move the movable section in a second direction opposite to the first direction based on the amount of correction, the vibration damper further comprising:

a movement-amount detector to detect an amount of movement of the movable section moved by the support section; and a controller to perform a feedback control to reduce an amount of difference between the amount of correction computed by the computing processor and the amount of movement detected by the movement-amount detector, wherein the controller controls control information to be used in the feedback control, according to quantity of an electronic device to be mounted on the vibration damper, the vibration damper further comprising:

a selector to select a calibration mode to determine whether to change the control information; and an output value acquisition section to acquire an output value from the support section having moved the movable section to a predetermined position in response to a selection of the calibration mode by the selector, wherein the controller calculates the quantity of the electronic device mounted on the vibration damper based on the output value acquired by the output value acquisition section, and determines whether to change the control information based on the quantity calculated by the controller, the vibration damper further comprising a notifier to notify that the controller fails to perform the feedback control when the output value acquired by the output value acquisition section reaches an upper limit of the output value.

* * * * *